(12) United States Patent
Rule

(10) Patent No.: US 7,685,715 B2
(45) Date of Patent: Mar. 30, 2010

(54) METHODS FOR PROCESSING THE CONTENTS OF CONTAINERS AND TANKS AND METHODS FOR MODIFYING THE PROCESSING CAPABILITIES OF TANKS AND CONTAINERS

(75) Inventor: David D. Rule, Weiser, ID (US)

(73) Assignee: KILR-CHILR, LLC, Weiser, ID (US)

( * ) Notice: Subject to any disclaimer, the term of this patent is extended or adjusted under 35 U.S.C. 154(b) by 364 days.

(21) Appl. No.: 11/433,323

(22) Filed: May 11, 2006

(65) Prior Publication Data

US 2007/0264389 A1 Nov. 15, 2007

(51) Int. Cl.
| | |
|---|---|
| B21D 51/16 | (2006.01) |
| B23P 6/00 | (2006.01) |
| C12C 1/02 | (2006.01) |
| C12C 11/00 | (2006.01) |
| A47J 31/047 | (2006.01) |
| F28D 7/12 | (2006.01) |
| F28F 3/12 | (2006.01) |
| F28F 13/00 | (2006.01) |

(52) U.S. Cl. .......... 29/890.031; 29/890; 29/890.051; 99/276; 99/277; 99/281; 165/136; 165/156; 165/169

(58) Field of Classification Search .......... 29/890.03, 29/890.051; 99/276, 277, 281; 141/100; 165/128, 129; 435/813
See application file for complete search history.

(56) References Cited

U.S. PATENT DOCUMENTS

| | | | |
|---|---|---|---|
| 348,115 A | 8/1886 | Egan | |
| 1,540,806 A | 6/1925 | Rohn | |
| 1,561,769 A | 11/1925 | Ballew | |
| 1,588,707 A | 6/1926 | Csiga | |
| 2,016,746 A * | 10/1935 | Ireland | 165/75 |
| 2,193,318 A | 3/1940 | Floyd | |
| 2,230,905 A | 2/1941 | Popky | |
| 2,316,273 A | 4/1943 | Ludwig et al. | |
| 2,356,779 A | 8/1944 | Morrison | |
| 2,407,159 A | 9/1946 | Jones | |
| 2,610,478 A * | 9/1952 | Lofstedt | 62/515 |
| 2,662,749 A | 12/1953 | Bushcow | |
| 2,715,627 A | 8/1955 | Mehltretter et al. | |
| 2,751,672 A * | 6/1956 | Reed | 29/429 |
| 2,847,193 A | 8/1958 | Carter | |
| 3,458,917 A | 8/1969 | Mueller | |
| 3,478,669 A * | 11/1969 | Lanes | 99/276 |

(Continued)

OTHER PUBLICATIONS

U.S. Appl. No. 11/657,957, filed Jan. 23, 2007, D. Rule.

(Continued)

Primary Examiner—David P Bryant
Assistant Examiner—Alexander P Taousakis
(74) Attorney, Agent, or Firm—Wells St. John, P.S.

(57) ABSTRACT

A method for modifying the processing capabilities of a container. The method includes providing a container that defines a cavity and comprises a wall. The wall defines at least a portion of the cavity and has thermal energy transfer characteristics. At least one of the thermal energy transfer characteristics comprises a first value. Changing the first value of the one thermal energy transfer characteristic to a second value for at least a first portion of the wall, the second value being different from the first value.

9 Claims, 18 Drawing Sheets

U.S. PATENT DOCUMENTS

| | | | | |
|---|---|---|---|---|
| 3,482,625 | A | * | 12/1969 | Bray .......................... 165/108 |
| 3,584,194 | A | * | 6/1971 | Kautz et al. ................. 392/484 |
| 3,643,733 | A | | 2/1972 | Hall et al. |
| 3,814,003 | A | * | 6/1974 | Vacano ........................ 99/276 |
| 3,965,694 | A | | 6/1976 | Vignal et al. |
| 4,002,111 | A | | 1/1977 | Pujol |
| 4,002,200 | A | | 1/1977 | Raskin |
| 4,036,699 | A | | 7/1977 | Quigg |
| 4,092,976 | A | | 6/1978 | Buckner |
| 4,120,425 | A | | 10/1978 | Bethurum |
| 4,146,089 | A | | 3/1979 | Mueller et al. |
| 4,148,355 | A | | 4/1979 | Gehring |
| 4,164,902 | A | | 8/1979 | Maarleveld |
| 4,179,902 | A | | 12/1979 | Mueller et al. |
| 4,206,237 | A | | 6/1980 | Sakata et al. |
| 4,212,950 | A | | 7/1980 | Adams |
| 4,216,659 | A | | 8/1980 | French |
| 4,250,954 | A | | 2/1981 | Remlinger et al. |
| 4,305,456 | A | | 12/1981 | Mueller et al. |
| 4,322,446 | A | | 3/1982 | Heess et al. |
| 4,329,433 | A | | 5/1982 | Seebeck et al. |
| 4,351,271 | A | | 9/1982 | Mueller et al. |
| 4,487,785 | A | | 12/1984 | Epchtein |
| 4,517,884 | A | | 5/1985 | Jandrich |
| 4,560,565 | A | | 12/1985 | Wucherpfennig et al. |
| 4,593,611 | A | | 6/1986 | Bruch |
| 4,593,612 | A | | 6/1986 | Rieger |
| 4,597,422 | A | | 7/1986 | Kovacevich, Jr. |
| 4,664,689 | A | | 5/1987 | Davis |
| 4,671,329 | A | | 6/1987 | Kovacevich, Jr. |
| 4,700,528 | A | * | 10/1987 | Bernard ........................ 53/398 |
| 4,708,938 | A | | 11/1987 | Hickinbotham |
| 4,711,163 | A | | 12/1987 | Capuano |
| 4,711,785 | A | | 12/1987 | Bruch |
| 4,790,238 | A | | 12/1988 | Hsu |
| 4,792,454 | A | | 12/1988 | Lemonnier |
| 4,814,189 | A | | 3/1989 | Laude-Bousquet |
| 4,829,782 | A | | 5/1989 | Mueller et al. |
| 4,856,421 | A | | 8/1989 | Whitford |
| 4,889,805 | A | | 12/1989 | Da Silva Telles et al. |
| 4,908,219 | A | | 3/1990 | Modot et al. |
| 4,969,391 | A | | 11/1990 | Haulot |
| 4,979,377 | A | | 12/1990 | Fievet et al. |
| 5,027,971 | A | | 7/1991 | Perryman |
| 5,099,657 | A | | 3/1992 | Huang |
| 5,167,274 | A | | 12/1992 | Mueller |
| 5,173,318 | A | | 12/1992 | Leu et al. |
| 5,287,918 | A | | 2/1994 | Banks et al. |
| 5,365,830 | A | | 11/1994 | MacLennan et al. |
| 5,385,204 | A | | 1/1995 | Boardman et al. |
| 5,427,276 | A | | 6/1995 | Knuettel, II et al. |
| 5,505,256 | A | | 4/1996 | Boardman et al. |
| 5,509,462 | A | | 4/1996 | Demko et al. |
| 5,564,289 | A | | 10/1996 | Hino |
| 5,802,863 | A | | 9/1998 | Cowans |
| 5,867,991 | A | | 2/1999 | Jalink et al. |
| 5,925,563 | A | | 7/1999 | Redford |
| 5,972,402 | A | | 10/1999 | Scholl et al. |
| 5,975,335 | A | | 11/1999 | Witenhafer |
| 6,125,736 | A | | 10/2000 | Marin |
| 6,182,454 | B1 | | 2/2001 | McNeilan |
| 6,279,457 | B1 | | 8/2001 | Francia |
| 6,328,184 | B1 | | 12/2001 | Krol |
| 6,397,624 | B1 | | 6/2002 | Horwell |
| 6,668,915 | B1 | | 12/2003 | Materna |
| 6,702,002 | B2 | | 3/2004 | Wang |
| 6,703,055 | B1 | | 3/2004 | Klein et al. |
| 6,722,421 | B2 | | 4/2004 | MacKelvie |
| 6,877,504 | B2 | | 4/2005 | Scheff et al. |
| 2001/0042443 | A1 | | 11/2001 | Francia |
| 2002/0113072 | A1 | | 8/2002 | Lane |
| 2005/0274499 | A1 | | 12/2005 | Rule |

OTHER PUBLICATIONS

"Wine-Refrigeration," produced by Pasco Poly Tank—all updated articles from Pasco Poly's *Winery News*, edited by Lawrence Dawson, publication date unknown (11 pages total).

PCT/US07/10767, Sep. 16, 2008, PCT Written Opinion.

PCT/US07/10767, Sep. 16, 2008, PCT Search Report.

Brewer, "What are Metals" Material Science and Technology Teachers Workshop, Univeristy of Illinois Champaign-Urbana, http://matse1.mse.uiuc.edu.

Webster's Third New International Dictionary of the English Languange Unabridged p. 1579 vol. II H-R Encyclopedia Britannica, Inc.

* cited by examiner

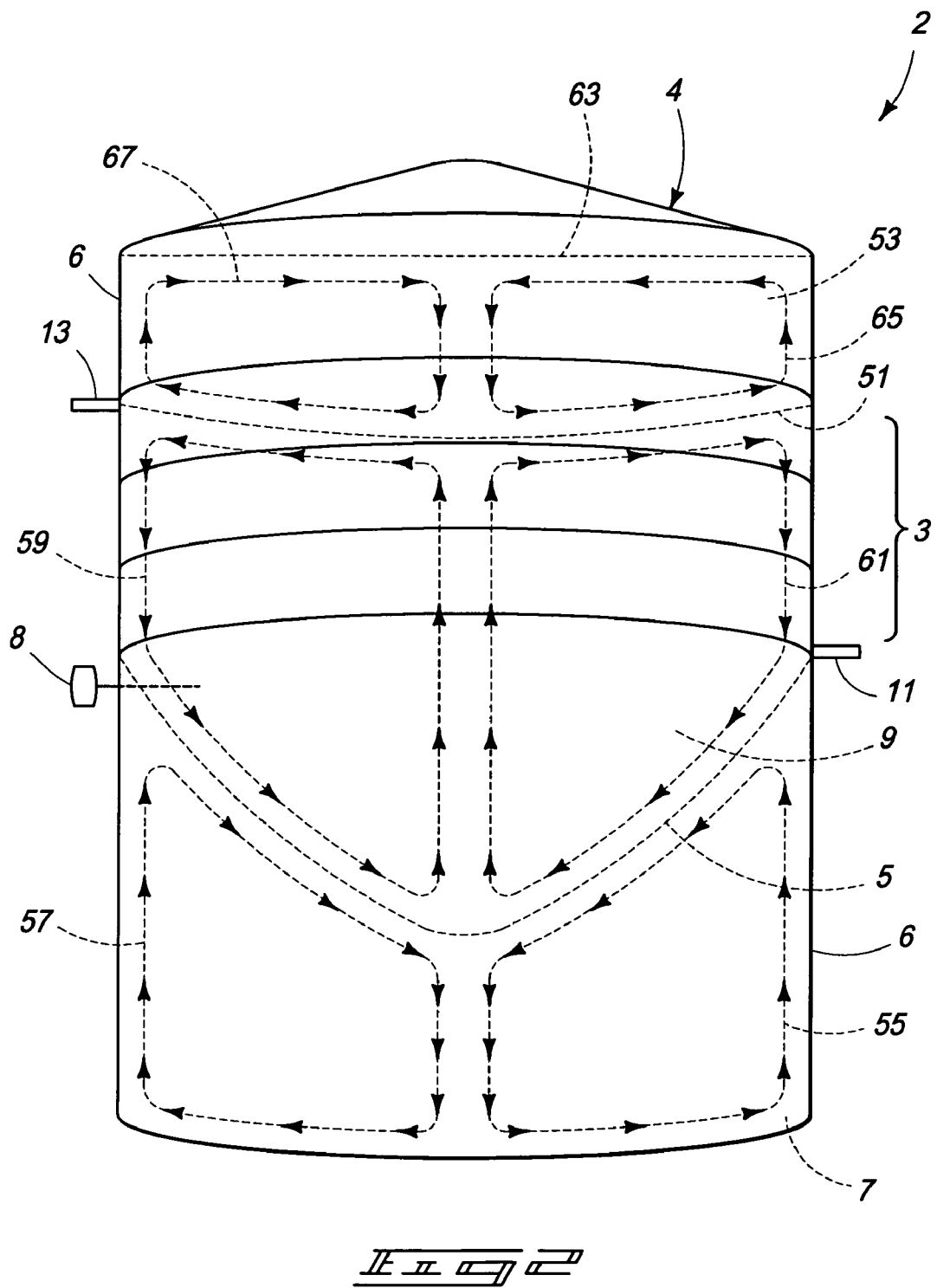

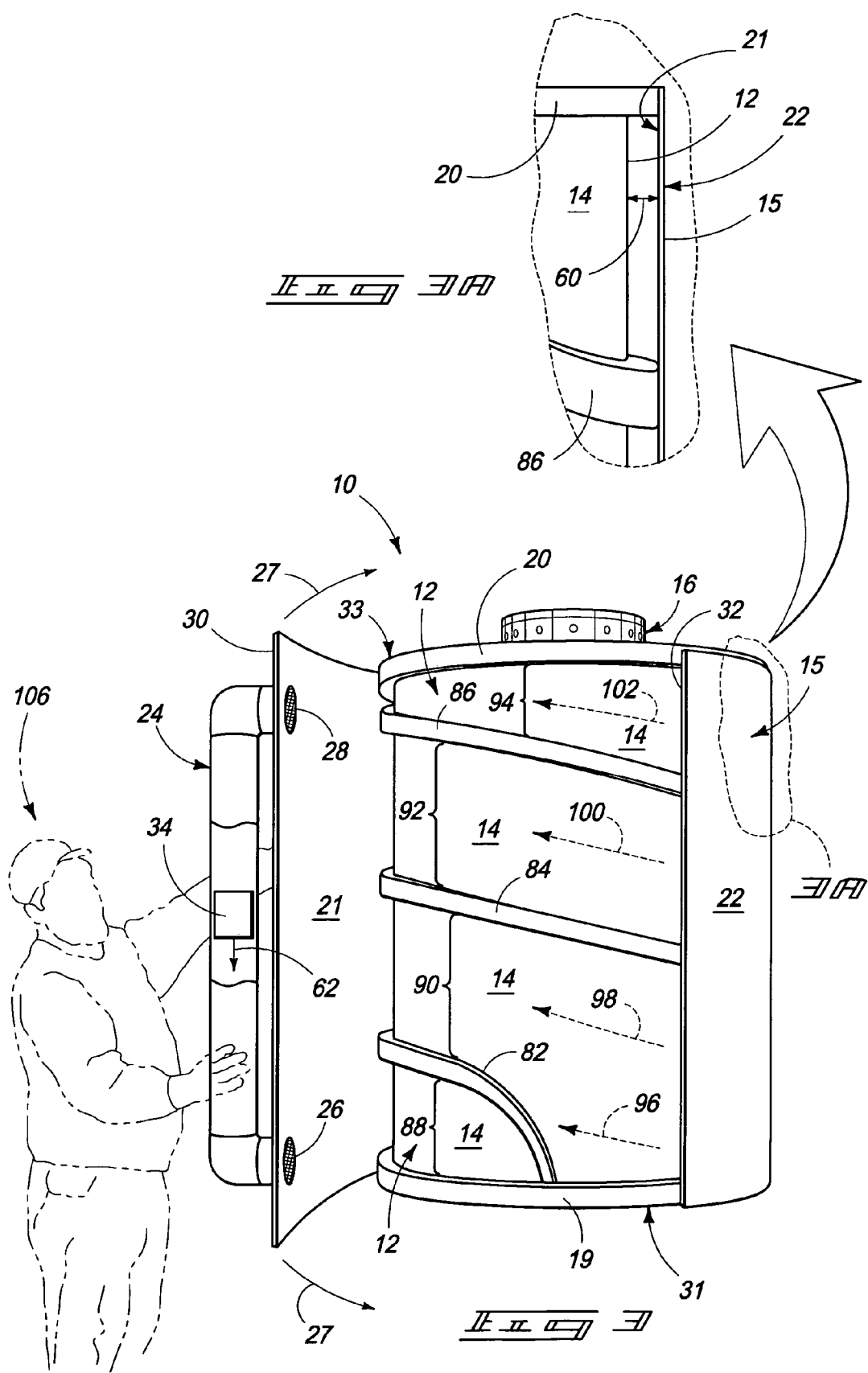

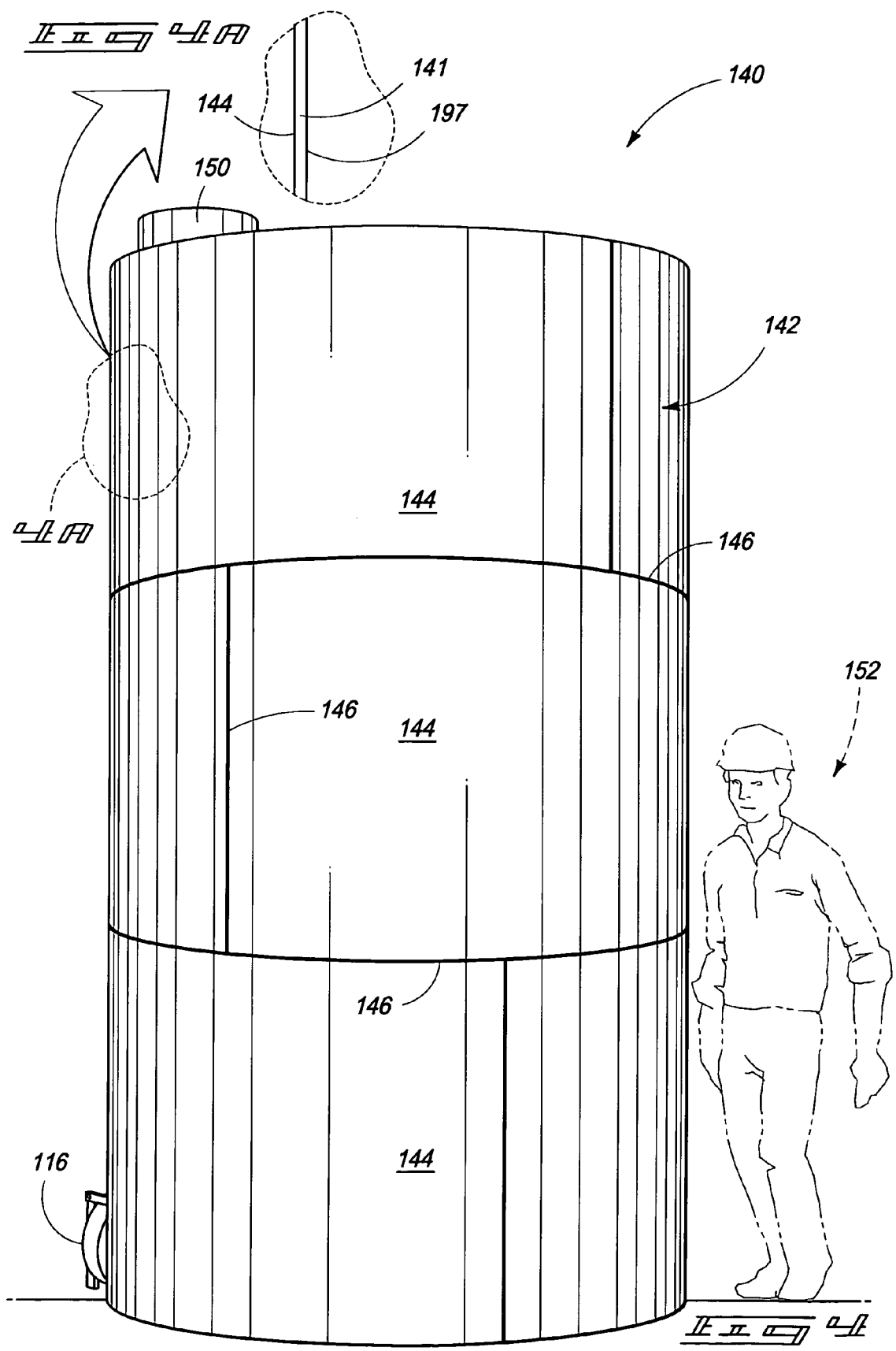

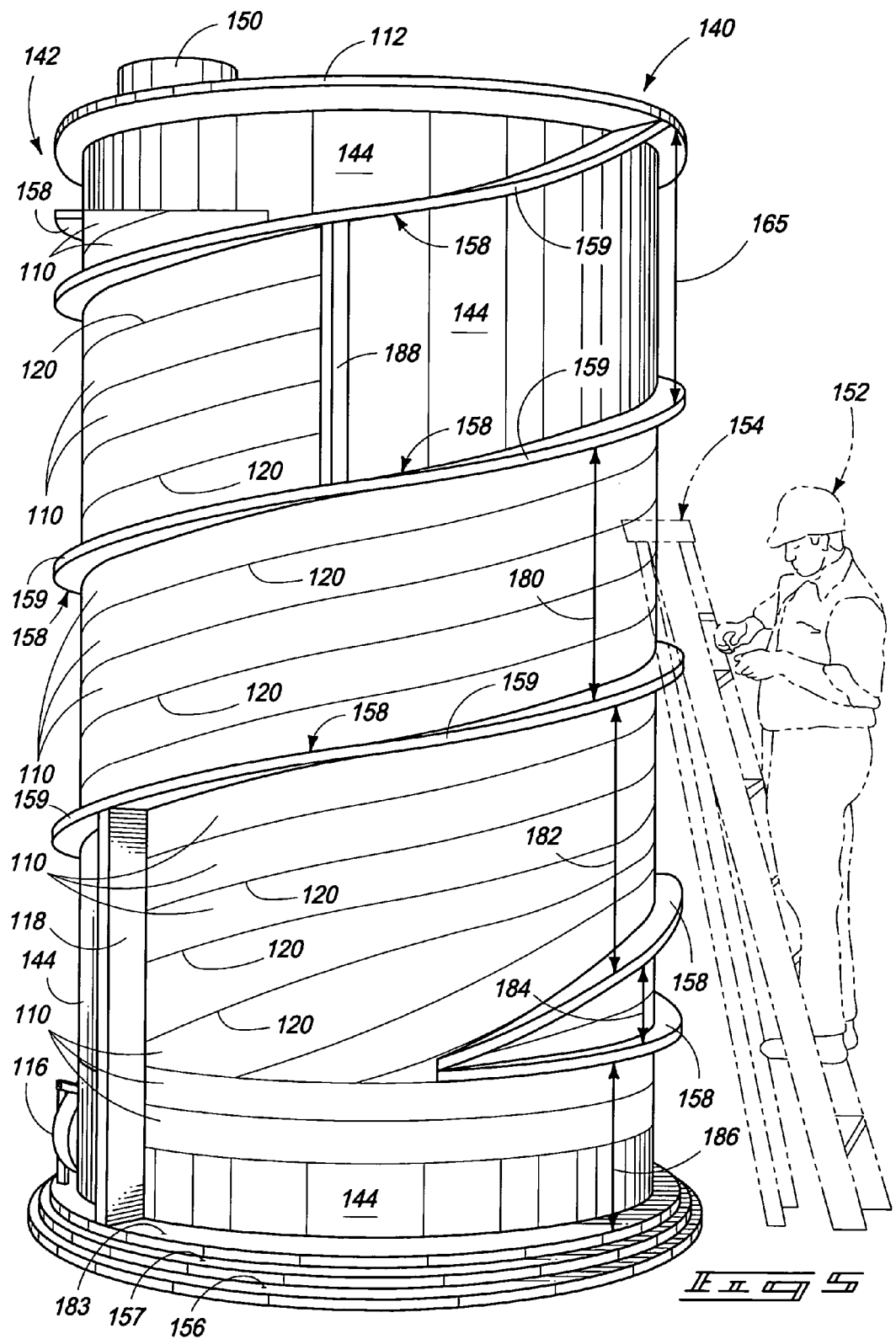

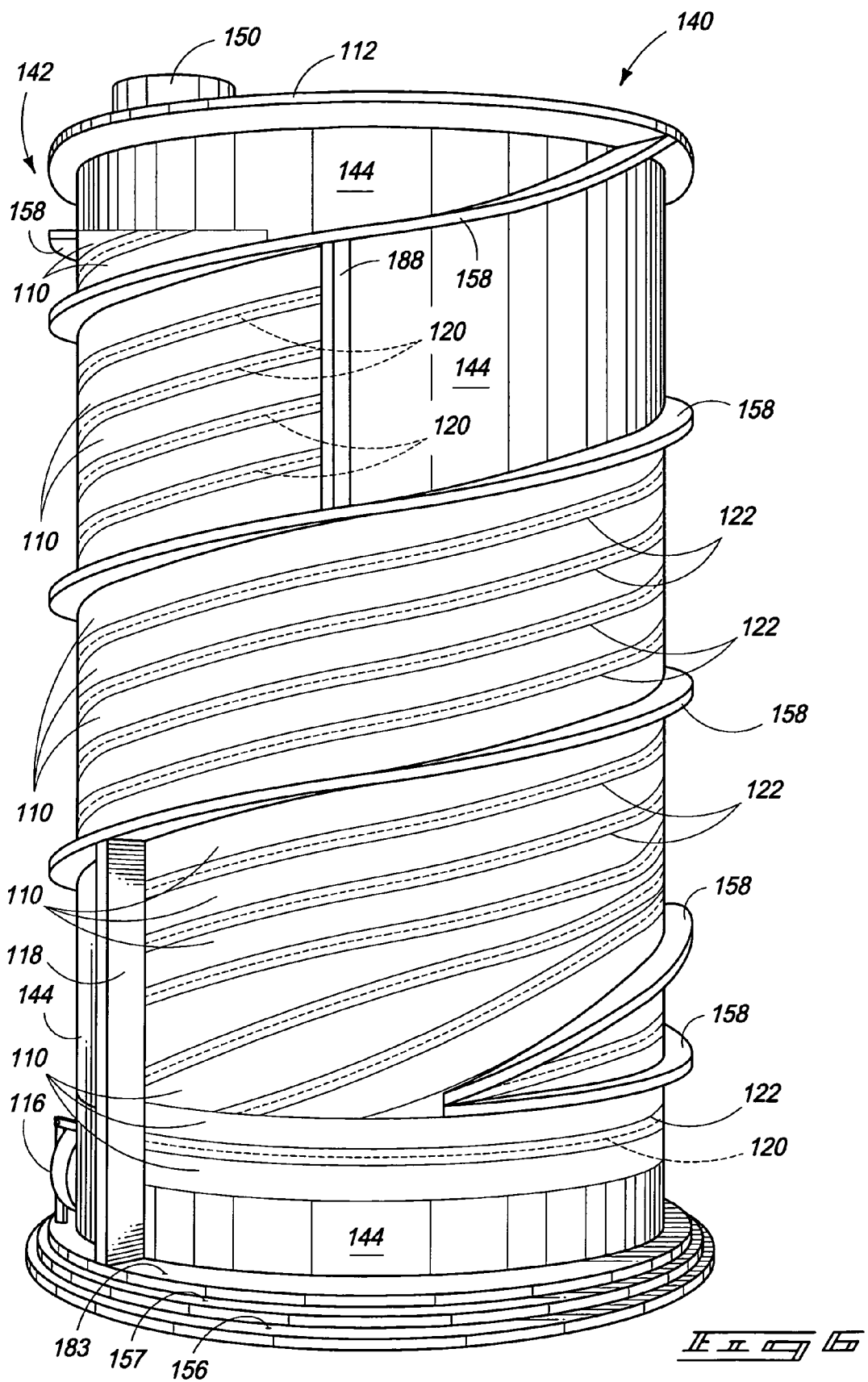

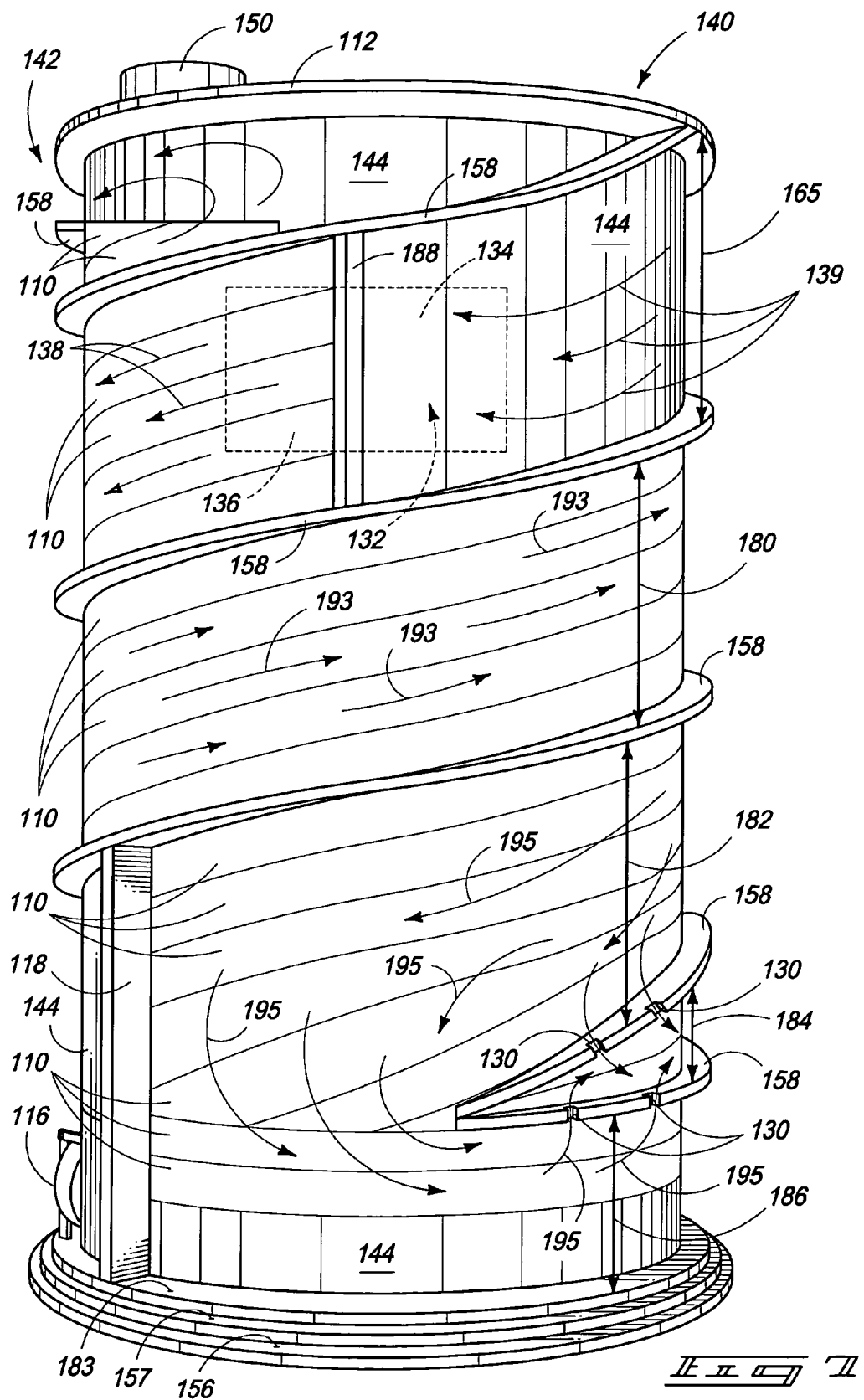

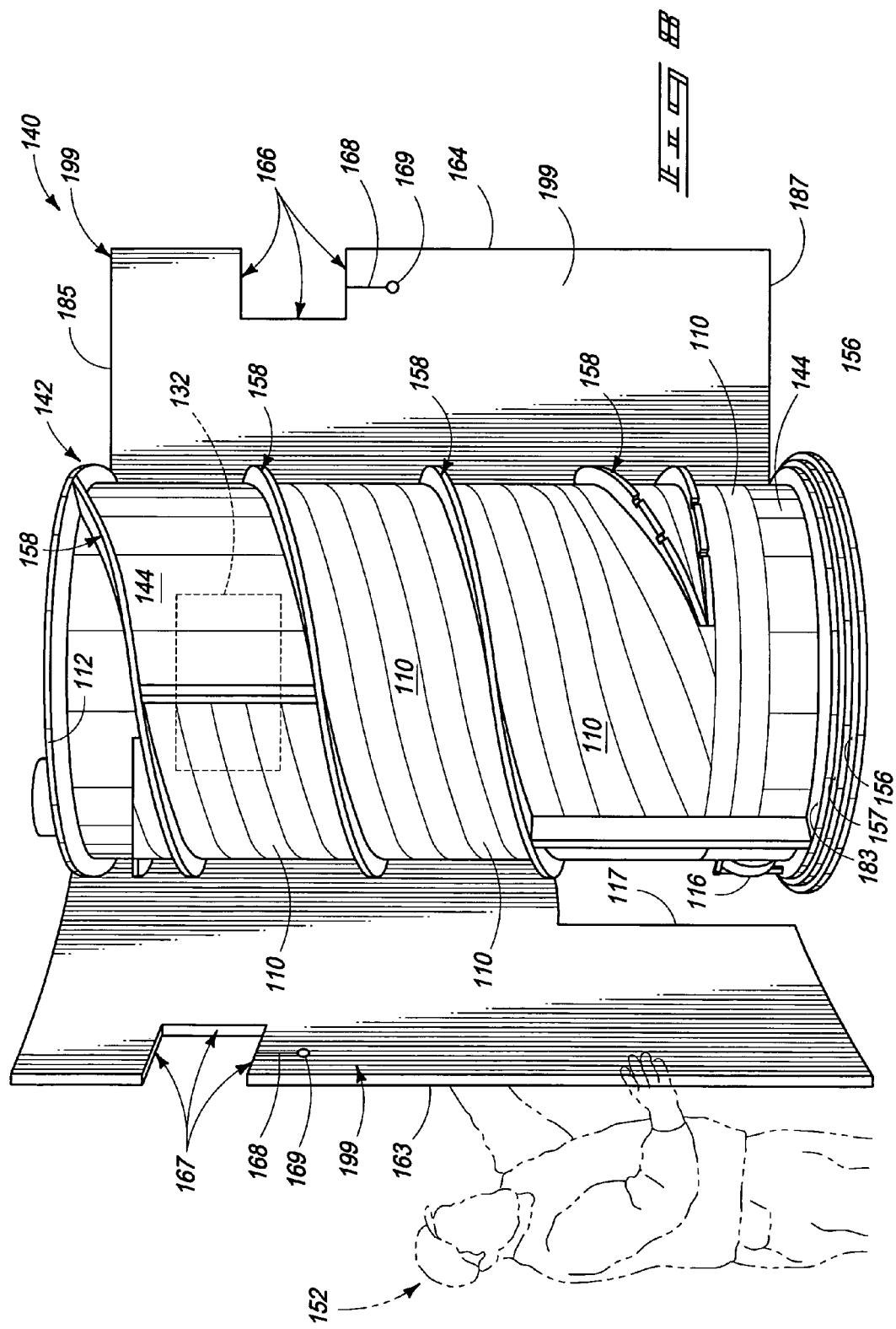

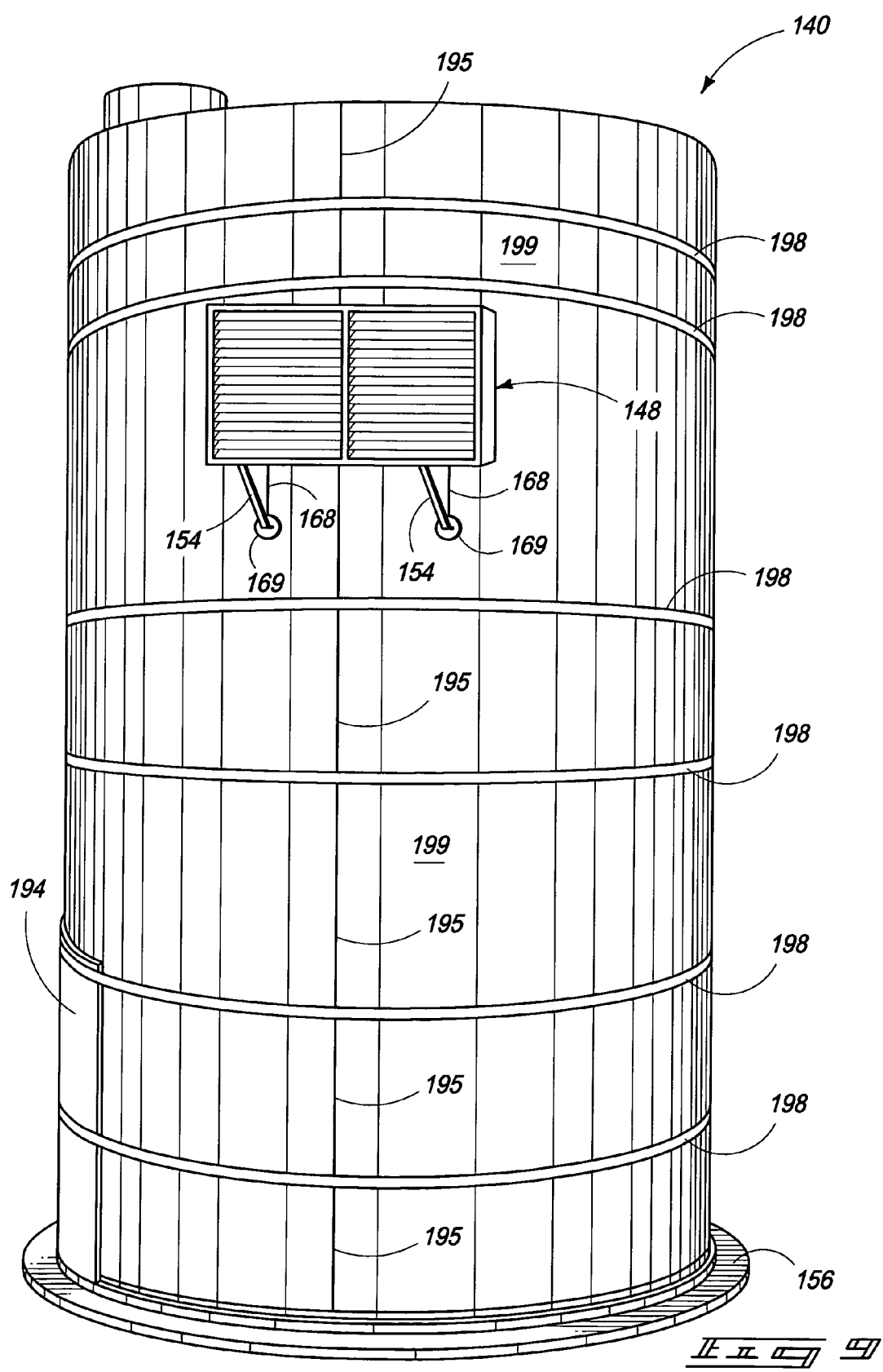

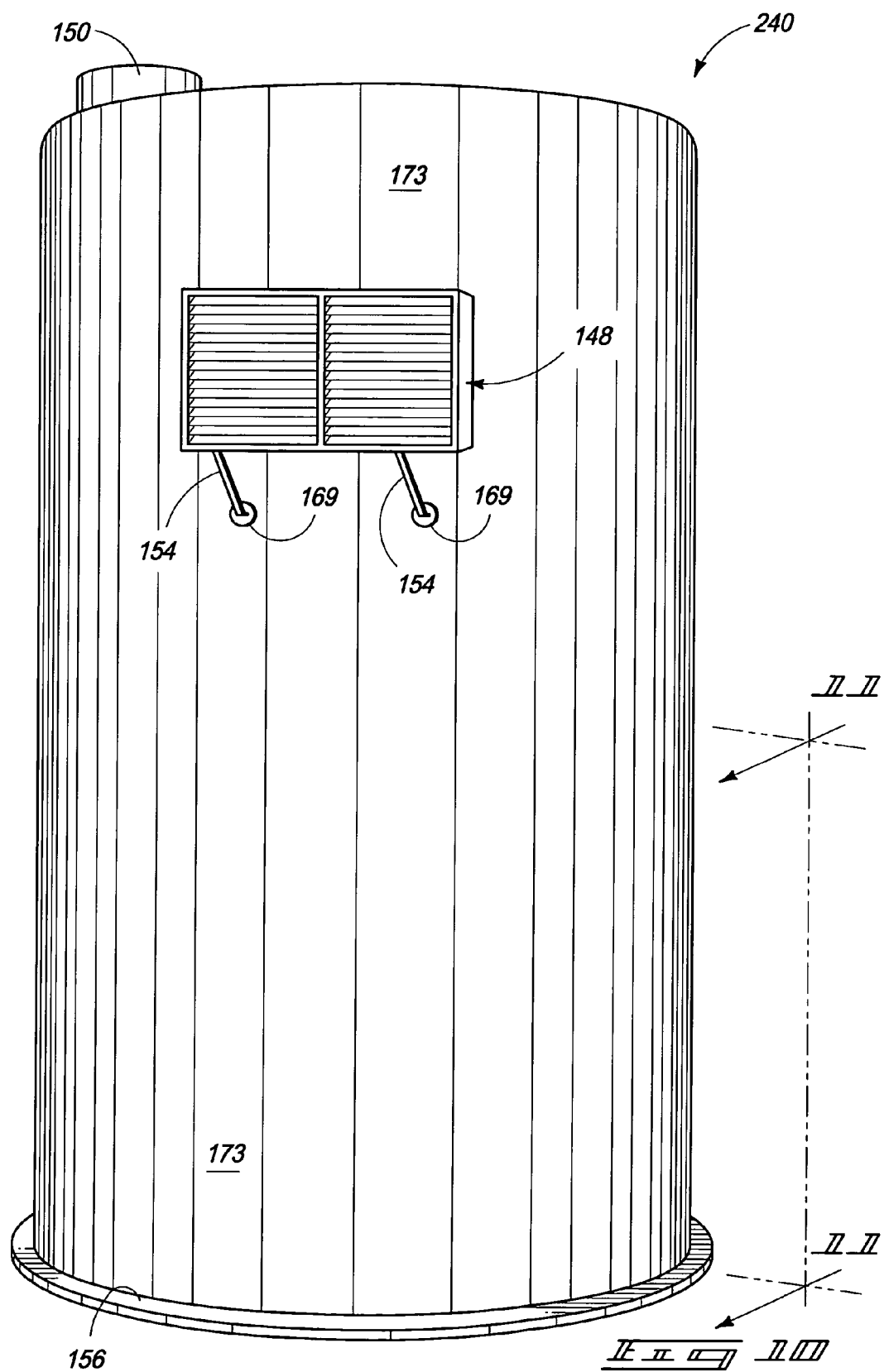

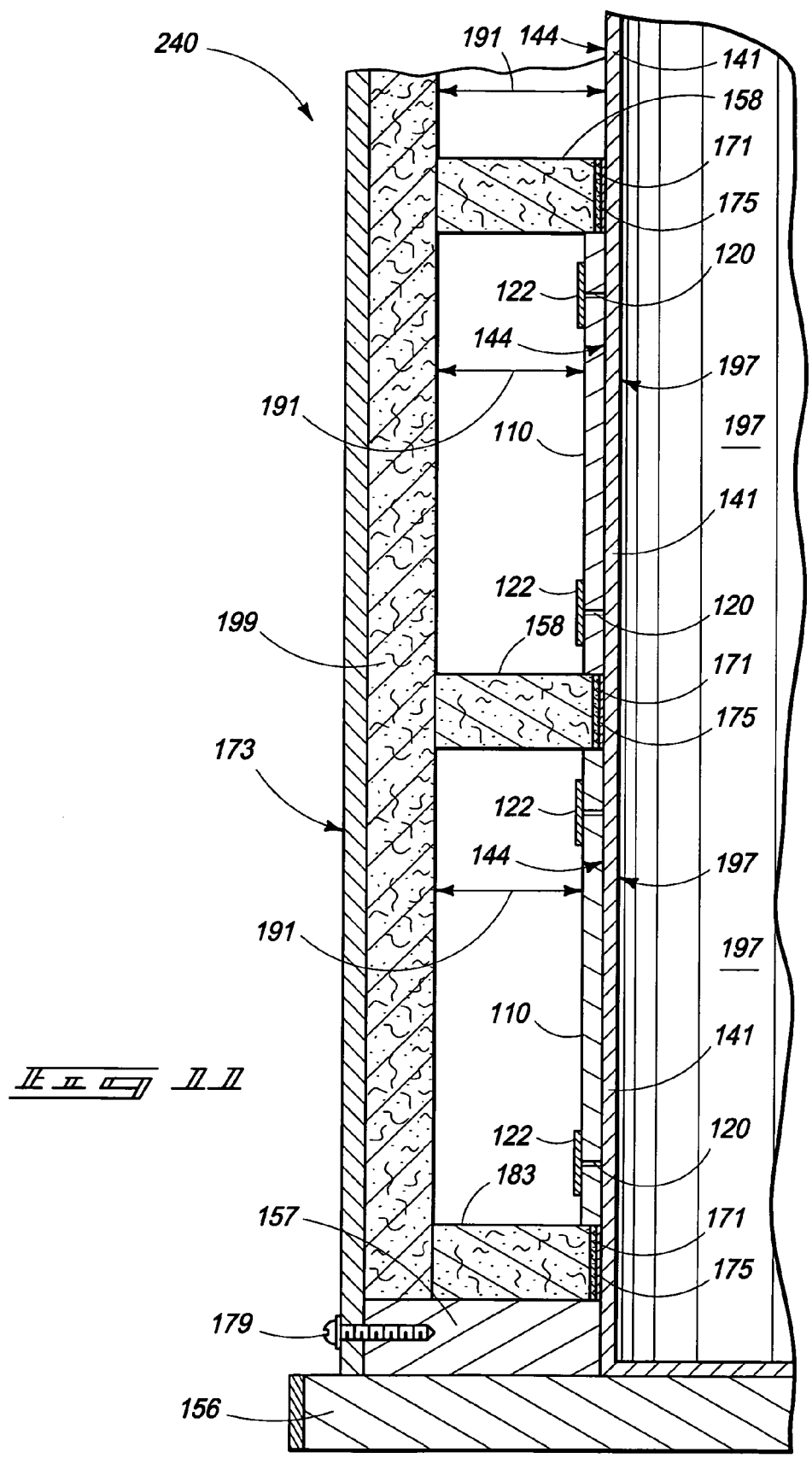

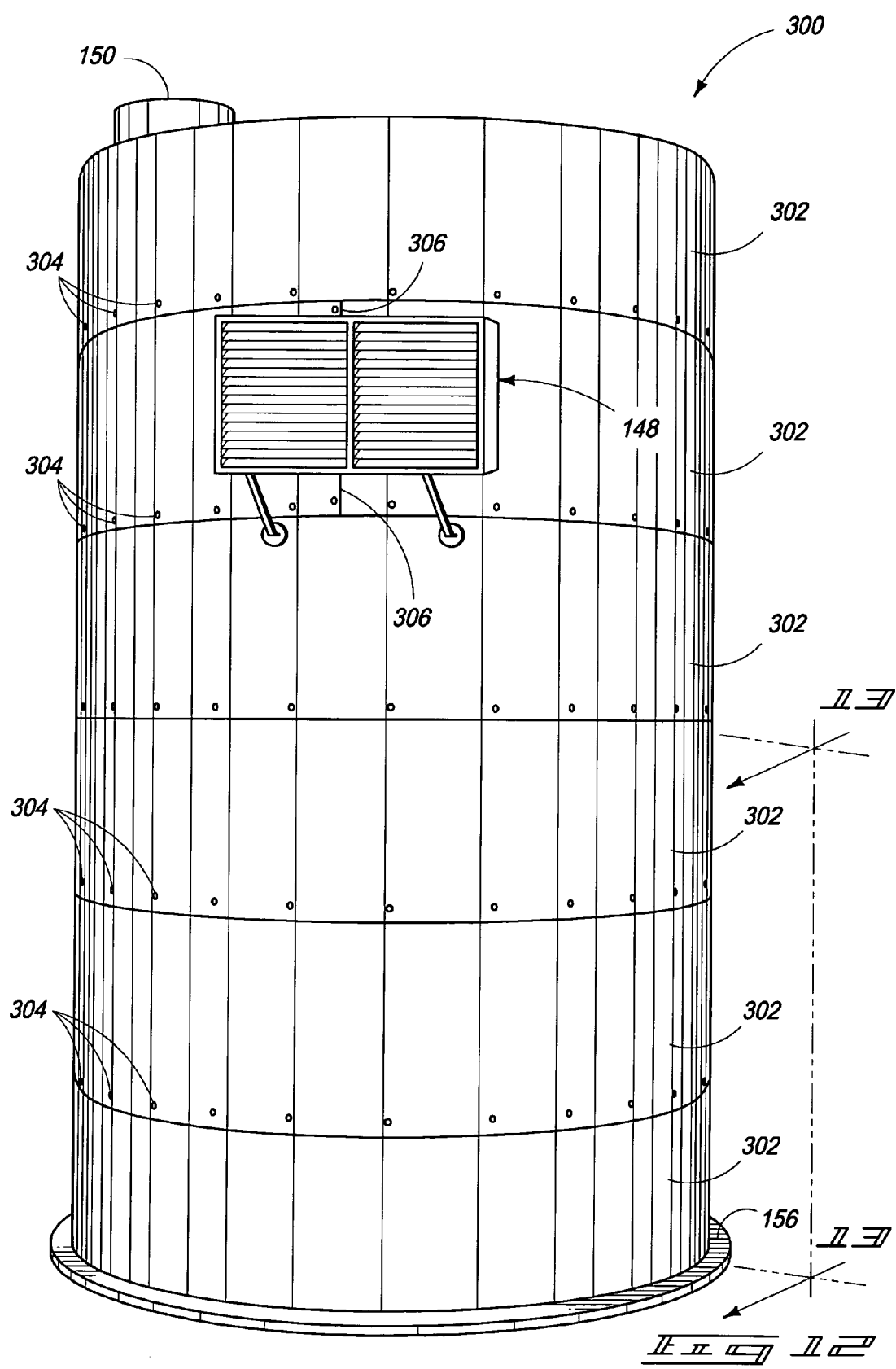

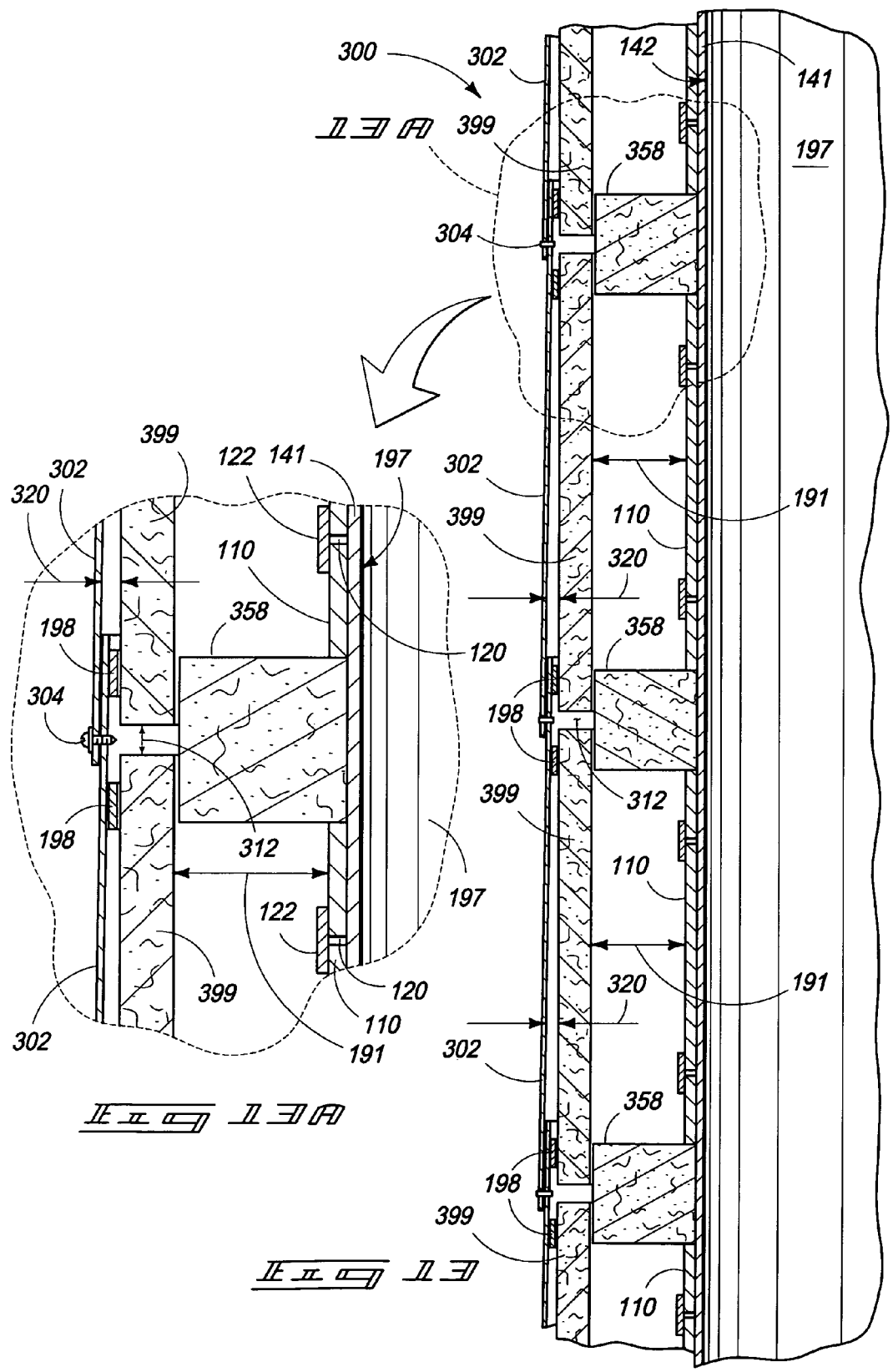

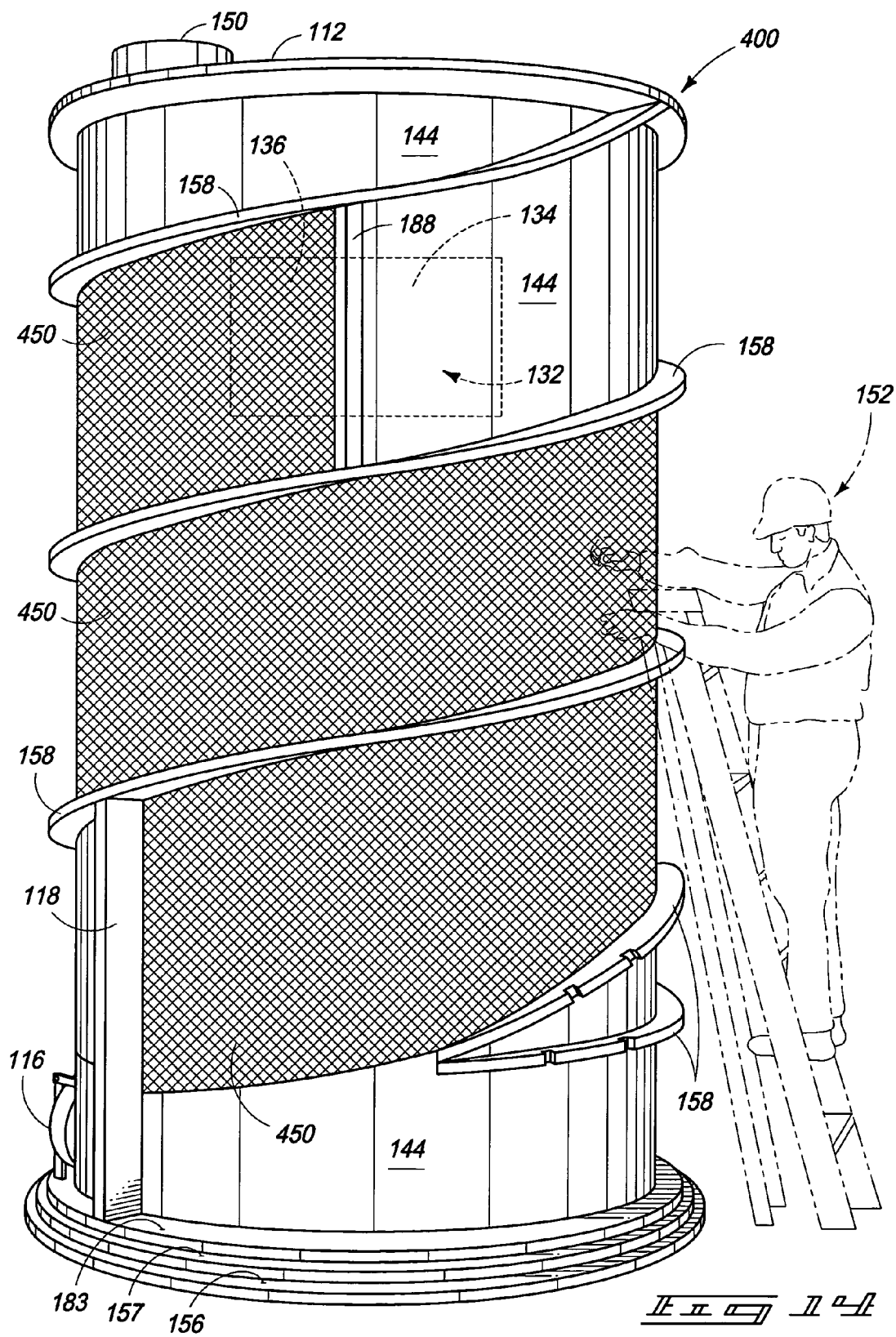

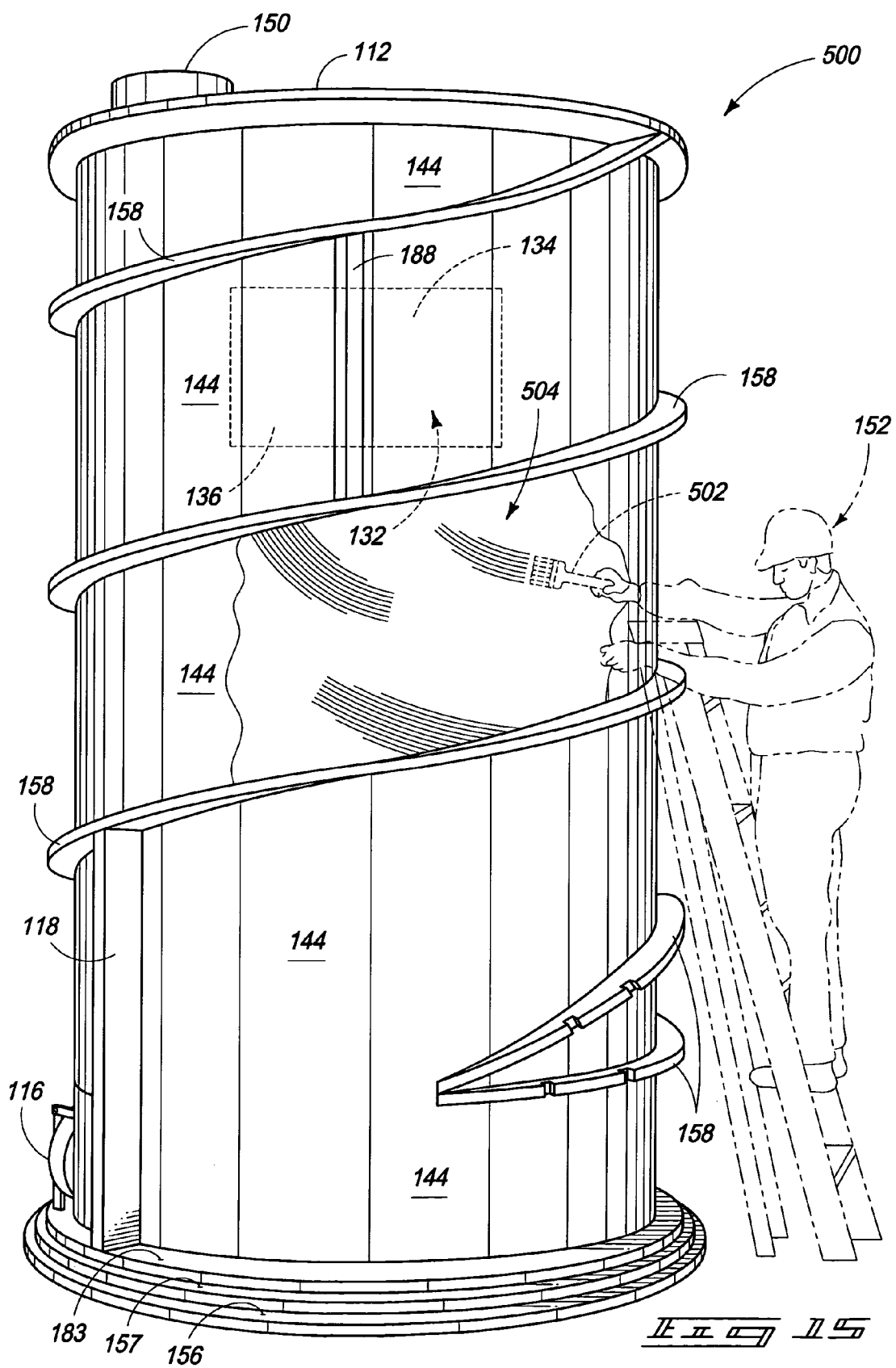

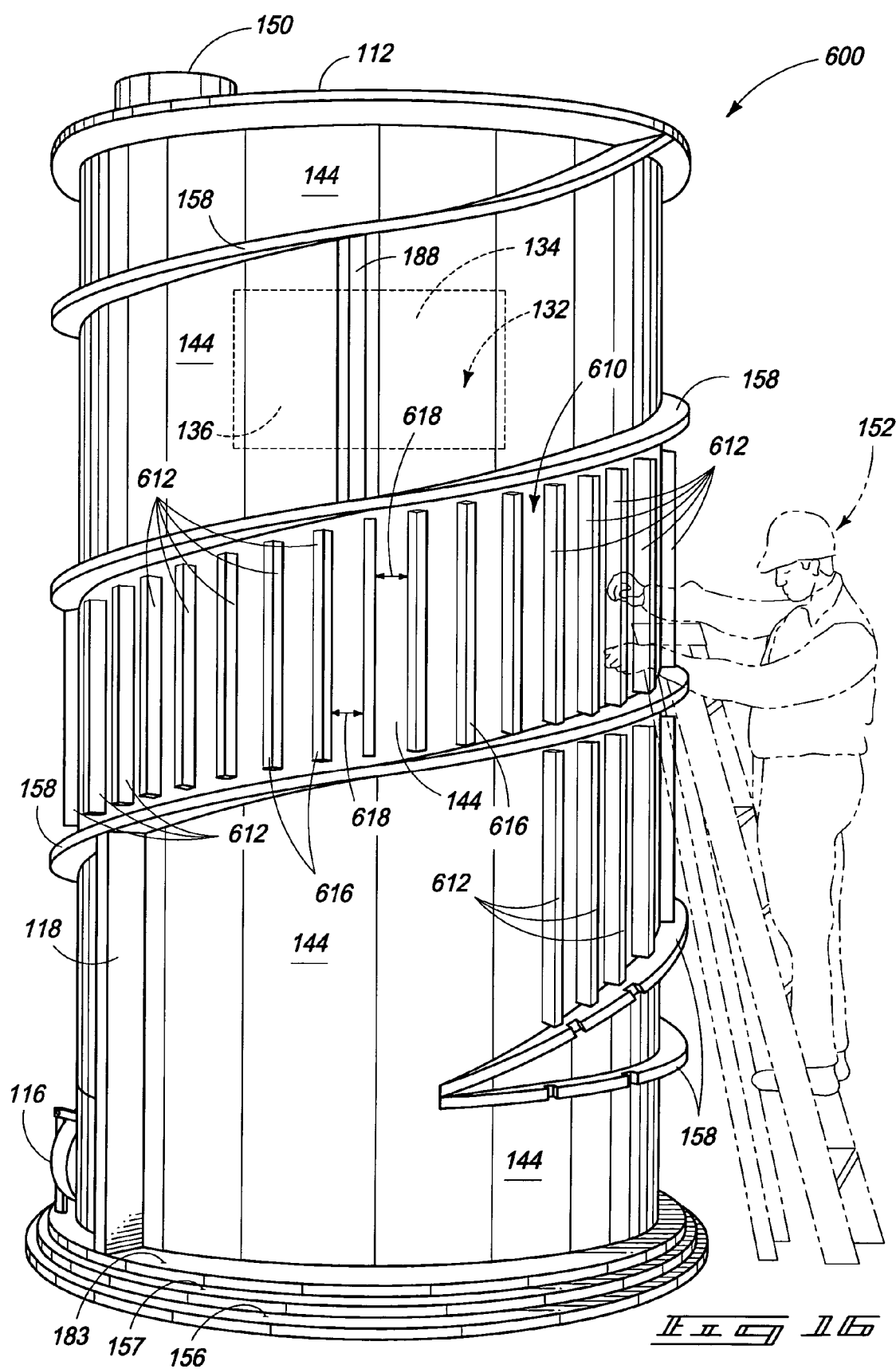

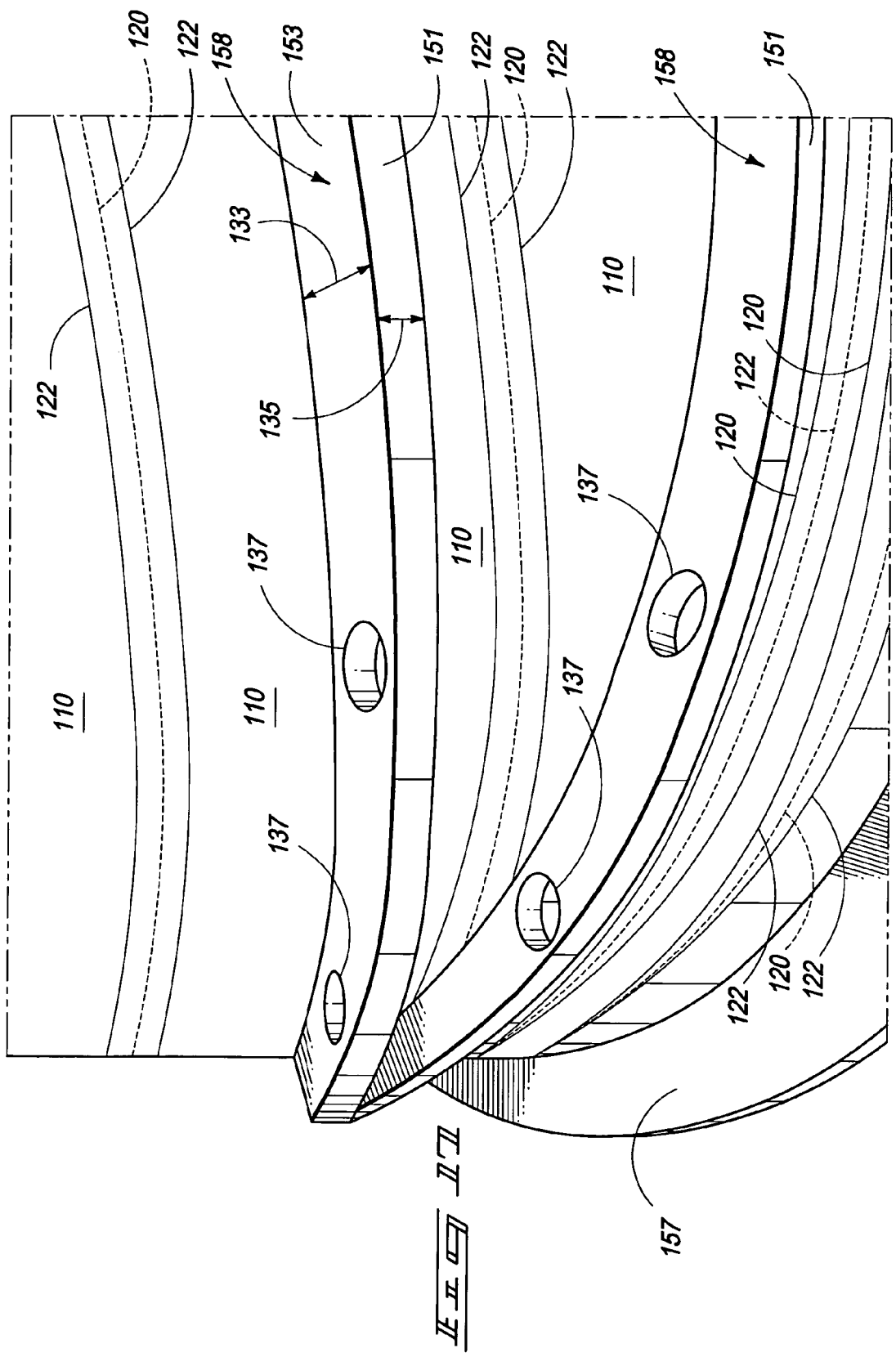

METHODS FOR PROCESSING THE CONTENTS OF CONTAINERS AND TANKS AND METHODS FOR MODIFYING THE PROCESSING CAPABILITIES OF TANKS AND CONTAINERS

TECHNICAL FIELD

The invention pertains to systems, apparatuses and methods for processing the contents of containers and tanks; methods for modifying the processing capabilities of tanks and containers; and more particularly, to systems, apparatuses and methods for regulating, adjusting and controlling the temperatures of the contents within containers and tanks.

BACKGROUND OF THE INVENTION

Containers, vessels and tanks (collectively referred to as "tanks") are used throughout numerous industries to hold contents therein during the manufacturing, processing, storing and transporting (collectively referred to as "process(ing)") of the contents. To produce and maintain quality characteristics of the contents provided in the tanks, and ideally enhance the quality characteristics, temperature of the contents is an important parameter that must be continually controlled by adjusting, modifying and regulating.

An exemplary industry that uses tanks to process contents provided therein is the wine industry. The wine industry uses tanks to receive and process fruit juice, for example grape juice, into wine. The temperature of the juice during processing is arguably the most important parameter or factor that can be selected, adjusted and modified to produce and maintain wine having the highest character and quality. That is, the juice and wine must be maintained within strict temperature ranges or tolerances to enable the quality production of the wine. Moreover, different stages of production may require different temperatures for the production of quality wine and each temperature is preferably stabilized to be within a couple of degrees of an ideal temperature to enhance and maintain that character and quality of the product.

Fermentation is an exemplary processing step of wine production wherein temperature is a very important factor to be controlled for establishing and maintaining the quality of the wine. In fact, fermentation is the heart of wine making wherein juice is processed and converted into wine. Accordingly, this process greatly influences the character and quality of the final wine product. Fermentation is a heat source process which is to say that thermal energy as heat is generated during the process. However, the fermentation process only occurs or progresses while the juice is in a specific temperature range. Consequently, the generation of heat during the fermentation process must be controlled and maintained (that is, the temperature of the juice must be maintained within the specific temperature range) to continue the fermenting process. Otherwise, if the temperature is not controlled, the juice will reach temperatures outside the specific temperature range causing the fermentation process to take a different biological and/or chemical process which is not conducive to producing quality wine. Therefore, the temperature of the juice must be continually adjusted, controlled and regulated to produce a quality wine. Furthermore, when the juice and/or wine reaches an undesirable temperature during any stage of processing, it is desirable to adjust the temperature to reach a favorable temperature as quickly as possible. Adjusting temperatures as quickly as possible will increase the potential for producing and/or maintaining a quality wine.

The current systems for adjusting, regulating and controlling the temperatures during wine production are deficient and inadequate to consistently produce the highest quality wine. FIG. 1 illustrates a conventional thermal regulating system 2 for an exemplary tank 4 used in the wine industry. Tank 4 comprises a wall structure forming an inner volume or interior volume (not shown) defined by an inner peripheral surface or interior surface (not shown) to receive and hold the volume of grape juice/wine mass. Thermal regulating system 2 comprises a thermal jacket 3 provided over a outer circumferential portion of an outer surface area of tank 4. For convenience, outer surface area of tank 4 will be referred to as an outer peripheral surface 6 (and understood to be opposite interior surface) of tank 4 with thermal jacket 3 over or covering only a portion of the outer peripheral surface 6.

In operation, a thermal source such as glycol is provided through thermal jacket 3 via an inlet 11 and an outlet 13. Before being provided to thermal jacket 3, the glycol is selectively heated or cooled relative the juice mass depending on the processing stage and desired temperature range of the juice mass during the processing stage. A thermodynamic relationship is developed between the glycol and juice mass wherein thermal energy is transferred through the wall structure between the glycol and juice mass. The thermal energy transfer occurs substantially across that portion of the wall structure at the outer periphery surface 6 covered by thermal jacket 3 and to the opposite portion of the interior surface not shown.

The thermal jackets 3 of conventional thermal regulating systems 2 are expensive to purchase, maintain and operate. Consequently, only a portion of the outer peripheral surface 6 of tank 4 is covered by thermal jacket 3. The conventional wisdom of the wine industry is that this design of the thermal regulating system 2 is adequate to control the temperature of the contents within the tank 4 and produce quality wine. For example, the wine industry generally assumes that this design of the thermal regulating system 2 is capable of forming a uniform temperature throughout the wine mass. However, the wine industry is mistaken.

Conventional thermal jackets 3 cover only 25% to 50% of the entire surface area of the wall structure of tank 4. With only a percentage or portion of the wall structure being provided in direct contact with thermal jacket 3, only a percentage of the juice mass within tank 4 is directly influenced by thermal energy transfer, for example, by thermal conduction, convection and radiation. The balance of the juice mass within tank 4 that is not located directly opposite and adjacent the thermal jacket 3 can only be affected by the thermal energy transfer via thermal convection and convection currents which must move throughout an entirety of the column of the juice mass. This situation results in the development of different regions within the juice mass having different temperatures which detrimentally influences the quality of the wine (more thoroughly discussed subsequently). This development of temperature strata regions is not known or understood by the wine industry.

Consequently, there is a need to improve the design of thermal regulating systems of tanks, vessels and/or containers to facilitate the control, regulation and quick adjustment of temperatures for the contents provided therein. This improvement to thermal regulating systems will greatly enhance and optimize the capability of producing a quality product within the tanks, vessels and/or containers.

SUMMARY OF THE INVENTION

In one aspect, the invention encompasses a method for modifying the processing capabilities of a container. The method includes providing a container that defines a cavity and comprises a wall. The wall defines at least a portion of the cavity and has thermal energy transfer characteristics. At least one of the thermal energy transfer characteristics comprises a first value. Changing the first value of the one thermal energy transfer characteristic to a second value for at least a first portion of the wall, the second value being different from the first value.

In another aspect, the invention encompasses a method for processing contents within a container. The method includes providing a container comprising a sidewall. The sidewall having thermal energy transfer characteristics. At least one of the thermal energy transfer characteristics comprises a first value. The method includes providing contents in the container and transferring thermal energy across at least a portion of the sidewall to the contents. The method includes changing the first value of the one thermal energy transfer characteristic to a second value for at least a segment of the portion of the sidewall, the second value being different relative the first value.

In still another aspect, the invention encompasses a container that comprises a wall. The wall includes an outer surface opposite an inner surface, the inner surface defining at least a portion of a cavity. The wall has a first rate of thermal energy transfer. The container includes a fluid channel over at least a segment of the outer surface of the wall. At least a portion of the segment having a second rate of thermal energy transfer being different from the first rate of thermal energy transfer.

In yet another aspect, the invention encompasses a system for processing contents within a container. The system comprises a container having an outer surface opposite an inner surface, the inner surface defines at least a portion of a cavity. A fluid channel is over at least a segment of the outer surface of the wall. A first portion of the segment has a first thermal energy transfer characteristic and a second portion of the segment has a second thermal energy transfer characteristic different from the first thermal energy transfer characteristic. A source of a fluid medium is in fluid communication with the fluid channel.

BRIEF DESCRIPTION OF THE DRAWINGS

Preferred embodiments of the invention are described below with reference to the following accompanying drawings.

FIG. 2 is the system of FIG. 1 illustrating temperature strata regions and current flows of the contents within the tank.

FIG. 3 is a vertical perspective view of a system designed by the inventor of the present invention for regulating temperatures of contents within a container or tank.

FIG. 3A is a partial sectional view of the system of FIG. 3.

FIG. 4 is a vertical perspective view of an exemplary tank illustrated at one method step for modification and incorporation into a system for regulating temperatures of contents within the exemplary tank according to a first embodiment of the present invention.

FIG. 4A is a partial sectional view of the exemplary tank of FIG. 4.

FIG. 5 is the exemplary tank of FIG. 4 illustrated at a method step of modification subsequent to the method step of FIG. 4.

FIG. 6 is the exemplary tank of FIG. 5 illustrated at a method step of modification subsequent to the method step of FIG. 5.

FIG. 7 is the exemplary tank of FIG. 6 illustrated at a method step of modification subsequent to the method step of FIG. 6.

FIG. 8 is the exemplary tank of FIG. 7 illustrated at a method step of modification subsequent to the method step of FIG. 7.

FIG. 9 is the exemplary tank of FIG. 8 illustrated at a method step of modification subsequent to the method step of FIG. 8, and represents the system for regulating temperatures of contents within the exemplary tank according to the first embodiment of the present invention.

FIG. 10 is a vertical perspective view of a system for regulating temperatures of contents within an exemplary tank according to a second embodiment of the present invention.

FIG. 11 is a partial side-sectional view of the system of FIG. 10 taken along sectional lines 11-11 of FIG. 10.

FIG. 12 is a vertical perspective view of a system for regulating temperatures of contents within an exemplary tank according to a third embodiment of the present invention.

FIG. 13 is a partial side-sectional view of the system of FIG. 12 taken along sectional lines 13-13 of FIG. 12.

FIG. 13A is a fragmentary view of the FIG. 13 partial side-section view.

FIG. 14 is a vertical perspective view of an exemplary tank illustrated at one method step for modification and incorporation into a system for regulating temperatures of contents within the exemplary tank according to a fourth embodiment of the present invention.

FIG. 15 is a vertical perspective view of an exemplary tank illustrated at one method step for modification and incorporation into a system for regulating temperatures of contents within the exemplary tank according to a fifth embodiment of the present invention.

FIG. 16 is a vertical perspective view of an exemplary tank illustrated at one method step for modification and incorporation into a system for regulating temperatures of contents within the exemplary tank according to a six embodiment of the present invention.

FIG. 17 is partial sectional view of an exemplary system for regulating temperatures of contents within a tank, the tank being illustrated with an exemplary baffle or vane structure for defining exemplary fluid channels according to a first embodiment of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
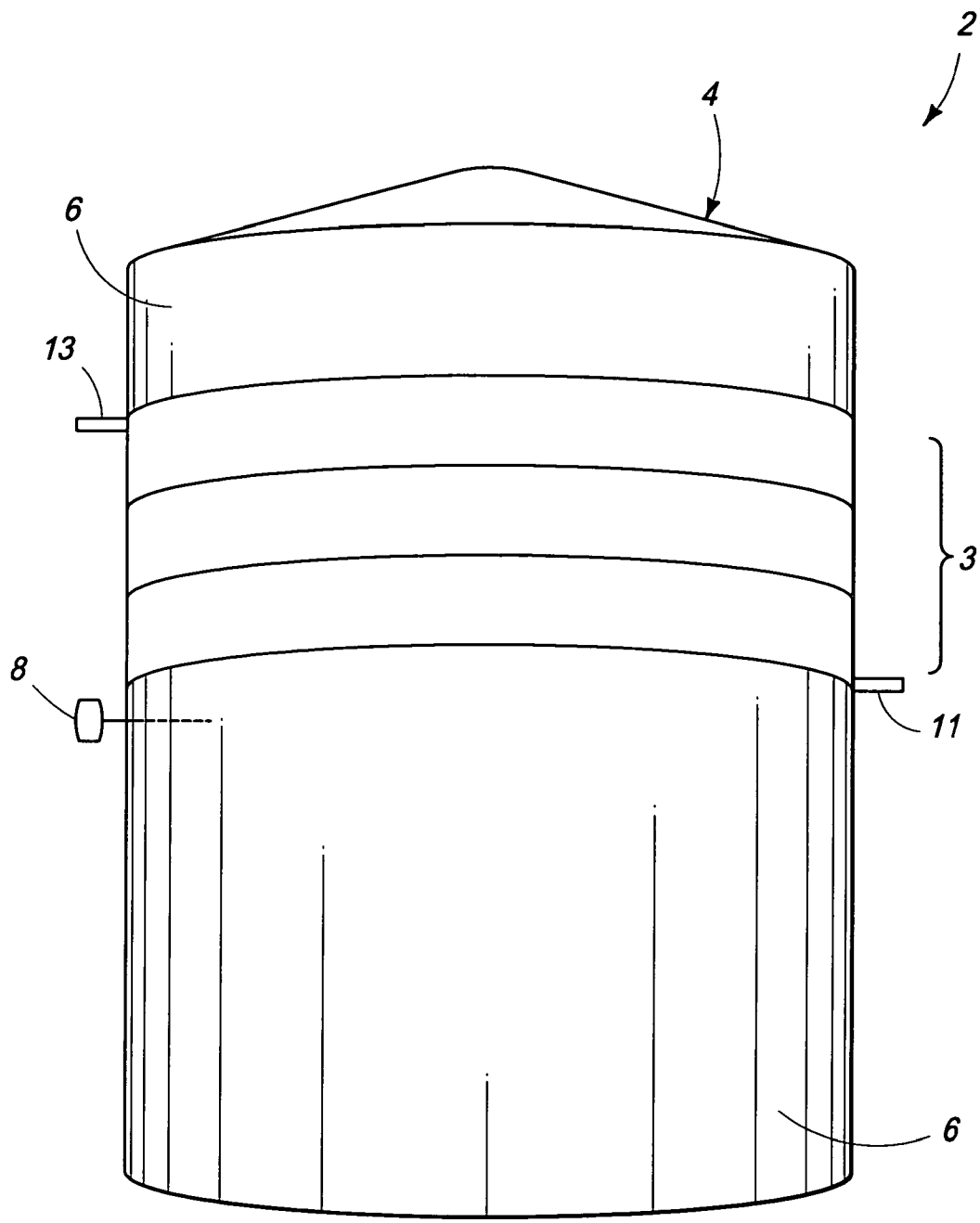
FIG. 1 is a vertical perspective view of a prior art system for regulating a temperature of contents within a tank.

The inventor of this application has performed numerous experiments and studies of juice masses in tanks during processing of same using the conventional designs of thermal regulating systems 2 illustrated in FIG. 1. Contrary to the general understanding of the wine industry, the inventor has determined that conventional designs of thermal regulating systems 2 do not create a uniform temperature distribution throughout an entirety of the juice mass. To discuss and illustrate the temperature data discovered by the inventor, a conventional thermal regulating system 2 with the thermal jacket 3 of FIG. 1 is again illustrated in FIG. 2, with the understanding that the temperature distribution represented is not understood or conventionally known.

It should be understood that conventional thermal regulating systems have a single temperature monitoring device 8 provided to extend through the wall of tank 4, in a stationary configuration, and into the juice mass to measure and provide temperature data of the juice mass. The conventional location of the temperature monitoring device 8 is positioned immediately below the thermal jacket 3. Taking temperature data from a single location of the contents within tank 4 prevents obtaining accurate and beneficial temperature data of the contents within tank 4. Moreover, taking temperature data from below the thermal jacket 3 where the thermal jacket 3 has the greatest influence on the temperature of the contents additionally prevents obtaining accurate and beneficial temperature data along an entirety of the column of the contents within tank 4.

For example, FIG. 2 illustrates general conditions that can develop using the conventional thermal regulating system 2 wherein three distinct temperature strata regions or zones are shown. The different temperature strata regions develop along a vertical axis of the column of the juice mass. The general consensus of the wine industry is that the juice mass is processing at uniform temperatures throughout the mass. Without a proper understanding or knowledge of what is occurring in the juice mass during processing, different regions or portions of the mass are processing at different temperatures. For example, if during fermentation at least one of the temperature strata regions is processing at an unfavorable temperature, the fermentation process changes drastically for the at least one temperature strata region. The different fermentation process detrimentally changes the chemical composition of the wine product for the at least one temperature strata region which drastically influences the quality of the entire final wine product.

To understand the development of these temperature strata regions, consider the thermal jacket 3 that covers approximately a third (⅓) of the surface area of the outer peripheral surface 6 of tank 4. As stated previously, with thermal jacket 3 covering only a portion of tank 4, only a portion of the juice mass is directly affected and influenced with the transfer of thermal energy via thermal jacket 3. For further discussion, consider an exemplary thermodynamic relationship wherein thermal energy as heat is transferred from the juice to the glycol, that is, the glycol is at a temperature below the temperature of the juice mass. Accordingly, in this exemplary thermodynamic relationship, the glycol is cooled before entering thermal jacket 3 with the goal of cooling the juice mass. Because only a portion of the juice mass is in the direct thermal energy transfer relationship with the glycol (and thermal jacket 3), the temperature strata regions develop within the juice mass. The temperature strata regions develop at different elevational levels along the vertical axis of the column of the juice mass. For example, an exemplary juice mass has an uppermost surface 63. The respective temperature strata regions are referenced as temperature stratum region 7 (starting elevationally from bottom level of tank 4); temperature stratum region 9 and temperature stratum region 53.

Furthermore, temperature strata boundaries develop between the respective temperature strata regions which impede and/or prevent movement of convection currents throughout an entirety of the juice mass. This movement of convection currents is necessary to develop a uniform temperature throughout an entirety of the juice mass. For example, temperature stratum boundary 5 develops between temperature strata regions 7 and 9 and temperature stratum boundary 51 develops between temperature strata regions 9 and 53. The temperature stratum region 9 is a cool juice mass that develops laterally adjacent and below thermal jacket 3 because this is the portion of the juice mass that is directly influenced by the cooling effect of thermal jacket 3. Temperature strata regions 7 and 53 are warm juice masses. Accordingly, temperature stratum region 9 of cool juice is between temperature strata regions 7 and 53 of warm juice. The development of these temperature strata boundaries and regions clearly indicates a nonuniform temperature exists throughout the juice mass.

Moreover, convection currents are not moving across the temperature strata boundaries to produce a uniform temperature throughout an entirety of the juice mass. To produce a uniform temperature, a convention current needs to move a portion of the warm juice from region 7 across boundary 5 into a portion of the cool juice of region 9, and vice versa, to moderate the respective temperatures of the respective regions 7 and 9. Similarly, a convention current needs to move a portion of the warm juice from region 53 across boundary 51 into a portion of the cool juice of region 9, and vice versa, to moderate the respective temperatures of respective regions 9 and 53. Without these convection currents flowing across respective boundaries, a uniform temperature throughout the juice mass can not develop.

Additionally, each temperature stratum region has its own system of current flows that impede and prevent the development of the these convection currents. For example, at least a pair of current flows develop within each temperature stratum region wherein the direction of the current flows complement each other to strengthen the temperature strata boundaries. For example, current flows 55 and 57 are formed in stratum region 7; current flows 59 and 61 are formed in stratum region 9; and current flows 65 and 67 are formed in stratum region 53. The direction of the pair of current flows 55 and 57 within stratum region 7 complements the direction of the pair of current flows 59 and 61 within stratum region 9 to strengthen stratum boundary 5. Similarly, the direction of the pair of current flows 65 and 67 within stratum region 53 complements the direction of the pair of current flows 59 and 61 within stratum region 9 to strengthen stratum boundary 51. Accordingly, the strata boundaries are strengthen effectively preventing the flow of convection currents across the boundaries to respective regions of juice. As stated previously, without these convection currents moving across the respective boundaries, a uniform temperature throughout the juice mass can not develop.

Moreover, if additional temperature strata regions are desired (more than three, or fewer than the illustrated three) within the juice mass, the strengthened strata boundaries prevent altering or modifying the temperature strata regions that routinely develop in conventional thermal regulating systems 2. Accordingly, conventional designs of thermal regulating systems 2 are inadequate to form uniform temperatures throughout the juice mass. Additionally, conventional designs of thermal regulating systems 2 are inadequate to selectively establish or form a plurality of temperature strata regions at selective elevational levels throughout the juice mass. Furthermore, with the strengthened strata boundaries, conventional designs are ineffective at modifying and adjusting the illustrated temperature strata regions.

An improved temperature or thermal regulating system for tanks has been developed by the named inventor of the present application, the disclosure of which is provided in a previously-filed patent application, Ser. No. 10/857,530, filed on May 29, 2004, entitled: "SYSTEMS, DEVICES AND METHODS FOR REGULATING TEMPERATURES OF TANKS, CONTAINERS AND CONTENTS THEREIN", the disclosure of which is incorporated herein by reference.

FIG. 3 illustrates an exemplary improved thermal regulating system 10 for regulating, adjusting and controlling the temperature of the contents in a container, vessel or tank 12. Exemplary tanks 12 include other containers such as vats, barrels, kegs which can be used, for example, in the food and beverage industries to store, transport and/or process the contents therein. An exemplary tank 12 can be formed from any material such as thermally conductive material, thermally insulative material, or any combination of these materials. Such exemplary materials include polymers, plastics, fiberglass, metals, stainless steel, polyethylene, and any combination of these materials. Moreover, an exemplary tank 12 may include an exemplary number of layers of these various materials to form various combinations of surface structures for tank 12. Additionally, exemplary tanks 12 can have any exemplary contents provided therein such as solids, fluids and gases, and including juice and/or wine. Exemplary processing includes the wine being cooled, heated and/or maintained at a specific temperature or within a specific temperature range.

The exemplary tank 12 has a wall structure that forms a cavity or interior volume having an interior periphery (not shown) to receive contents therein. An outer circumferential portion or outer peripheral surface 14 of the wall structure can include an entirety of the surface area of the wall structure of tank 12 or less than an entirety, for example, only the vertically extending sidewalls as shown in this exemplary embodiment. Tank 12 includes a bottom wall which is not shown but indicated generally by numeral 31 with the outer peripheral surface 14 extending upward from the bottom wall 31. The outer peripheral surface 14 has an exemplary cylindrical shape and continues to extend upward to terminate at a top wall which is not shown but indicated generally by numeral 33. A covered opening 16 in top wall 33 provides access to the cavity or interior volume of tank 12 allowing handling of the contents provided therein and allowing individuals to service and/or clean the inside of tank 12. While the illustrated tank 12 has a cylindrical shape with the circumference of outer peripheral surface 14 forming a circular horizontal cross section, it should be understood that tank 12 could have any shape configuration. For example, tank 12 can have a horizontal cross section defining a square, rectangular, hexagon or oval.

Tank 12 can located at a customer's place of business wherein the existing tank 12 would be incorporated into system 10. Alternatively, tank 12 can be purchased or provided for system 10 by a tank manufacturer or producer and then modified for incorporation into system 10. Tank 12 can be formed with the cavity having any dimension and/or size configuration for the inner periphery or interior volume for receiving the contents therein. For example, tank 12 can be capable of receiving and holding a volume of wine ranging from about 1 gallon to about 200,000 gallons.

Still referring to FIG. 3, a first circumferential ring 19 is positioned and secured to tank 12 proximate bottom wall 31 and encircles the outer peripheral surface 14 of tank 12. A second circumferential ring 20 is positioned and secured to tank 12 proximate top wall 33 and encircles the outer peripheral surface 14 of tank 12. Exemplary materials for rings 19 and 20 include thermally insulative and/or thermally conductive materials such as metals, metal alloys, foam, flexible foam, molded polymer composite, formed metal, low density foam, high density foam, styrofoam, high density styrofoam and high density polyethylene foam, and any combinations of these materials.

Tank 12 further includes vanes or baffles which are illustrated as a plurality of respective vanes or baffles 82, 84 and 86 secured to the outer peripheral surface 14. The exemplary configuration of baffles 82, 84 and 86 are shown to extend in a generally helical configuration on outer peripheral surface 14 surrounding tank 12. Even though referenced as a plurality of baffles 82, 84 and 86, it is to be understood that baffles 82, 84 and 86 can represent a single and continuously extending structure as generally shown here. Exemplary materials for baffles 82, 84 and 86 include thermally insulative and/or thermally conductive material such as foam, flexible foam, molded polymer composite, formed metal, metal alloys, low density foam, high density foam, styrofoam, high density styrofoam and high density polyethylene foam, green poly plank, foam rubber, rubber and any combinations of these materials.

Individual 106 is shown positioning a sheet or layer of flexible material 15 over tank 12. The exemplary layer or sheet of flexible material 15 is provided over and in contact with respective first and second circumferential rings 19 and 20. In another embodiment, sheet 15 is additionally provided over and in contact with baffles 82, 84 and 86 wherein the sheet 15 spaced over at least a portion of the surface area of the outer peripheral surface 14 of tank 12. The spacing between sheet 15, outer peripheral surface 14 and respective baffles 82, 84 and 86 form a cavity 60 (alternatively termed gap and void) with a portion of cavity 60 more clearly shown in FIG. 3A. Sheet 15 is provided to surround and enclose at least a circumferential portion of tank 12, and therefore, is preferably a material that can be formed, molded or curved to surround a structure.

An exemplary layer or sheet 15 includes thermally conductive material and/or thermally insulative material such as styrofoam, flexible foam, molded polymer composite, formed metal, plastics, steel, metals, metal alloys, polymers, ceramics, rubber, composites and wood, and any combinations of these materials. Sheet 15 in this exemplary embodiment is a continuous sheet that surrounds or encloses substantially an entirety of the surface area of outer peripheral surface 14 wherein cavity 60 is substantially enclosed from the environment. More thoroughly discussed below, cavity 60 will be divided to form a fluid conduit(s) or fluid channel(s) 60 (or fluid passageway(s)) over tank 12 configured to receive a fluid medium or thermal regulating fluid. It should be understood that sheet 15 can be constructed by a mold, or formed from a molded material, for example, a malleable substance, and therefore, preformed to be configured for positioning over tank 12.

Another exemplary embodiment of sheet 15 includes sheet 15 comprising a plurality of discrete sections configured to be provided together to form a single continuous structure surrounding tank 12. Moreover, it is understood that in one embodiment, sheet 15 does not substantially seal the cavity 60. That is, sheet 15 does not hermetically seal cavity 60 wherein cavity 60 is at least slightly open to the ambient environment or ambient air, and therefore, cavity 60 in one embodiment is under atmospheric pressure. In another embodiment, sheet 15 will substantially seal cavity 60 to be air tight, or hermetically sealed from ambient conditions of the environment, or any degree of sealment between completely open and hermetically sealed. Accordingly, cavity 60 can be under a pressure greater than atmospheric pressure.

Still referring to FIGS. 3 and 3A, thermal regulating system 10 further includes a fluid tube or duct 24 extending between respective portions of sheet 15. Tube 24 functions as a conduit for movement of a fluid medium between respective openings 26 and 28 formed in sheet 15 and into cavity 60. Tube 24 includes a forced fluid device 34 (represented as a block), for example a heat exchanger 34, to force and direct the fluid medium, in one embodiment, along fluid flow directions 96, 98, 100, and 102, and more thoroughly discussed below. Other exemplary forced fluid devices 34 include a blower, fan, chiller, heater, any refrigeration system and an air conditioning unit. Exemplary fluid mediums include liquids and/or gases, and any combination of the two, wherein an exemplary liquid includes glycol and an exemplary gas includes air. In one embodiment, an exemplary source of air is ambient air. The fluid medium is selectively provided to be in a cooled or heated state relative the temperature of the contents within the tank 12.

The fluid medium will circulate through cavity or void 60 against outer peripheral surface 14 of tank 12. Heat exchanger 34 is provided in fluid communication with cavity 60 via fluid tube 24 and provides the fluid medium in the selected cooled or warmed (heated) state into cavity 60 against the outer peripheral surface 14 of tank 12. Accordingly, one of openings 26 and 28 functions as an inlet while the other of openings 26 and 28 functions as an outlet depending on which direction the fluid medium is being driven through tube 24. One exemplary direction 62 is represented. The fluid medium establishes the thermal or thermodynamic relationship between the fluid medium and the contents within tank 12. That is, the thermodynamic relationship established between the fluid medium and contents occurs wherein thermal energy is transferred between the fluid medium and contents across the wall structure of tank 12 and through outer peripheral surface 14 (and the opposite interior surface not shown) of tank 12.

Referring again to sheet 15, such includes an inner surface 21 opposite an outer surface 22. The inner surface 21 faces outer peripheral surface 14 after sheet 15 is positioned over tank 12. The wrapping step of sheet 15 in direction 27 is only exemplary and can be in the opposite direction. When wrapping step is finished, edge 32 of sheet 15 is positioned adjacent edge 30 of sheet 15 to enclose outer peripheral surface 14 of tank 12 thereby forming cavity 60. Cavity 60 is established between inner surface 21 of sheet 15 and outer peripheral surface 14 of tank 12. Cavity 60 is further established between respective first and second circumferential rings 19 and 20. The volume of cavity 60 between respective rings 19 and 20 is further divided by baffles 82, 84 and 86. Exemplary spacing dimensions between inner surface 21 of sheet 15 and outer peripheral surface 14 of tank 12 will range from about 0.001 inch to about 5 feet, with another exemplary range being from about 1 inch to about 12 inches, with an exemplary spacing being about 4 inches.

Sheet 15 may be secured over tank 12 by attaching sheet 15 at least to respective first and second circumferential rings 19 and 20. In another embodiment, sheet 15 is only (or additionally with respect to rings) attached to any combination of uppermost portions of baffles 82, 84 and 86. Accordingly, in exemplary embodiments, at least portions of baffles 82, 84 and 86 extend to contact outer peripheral surface 14 of tank 12 and the inner surface 21 of sheet 15. The attachment of sheet 15 can be accomplished by glue, adhesive, weld studs, screws, or some other form of fastener or bonding technique. The exemplary embodiment of FIG. 3 has baffles 82, 84 and 86 extending as a single continuous length of material circuitously around tank 12. Other possible embodiments include having baffles formed or patterned in discrete segments having any combination of different lengths. Moreover, baffles 82, 84 and 86 could include numerous other patterns or configurations other than the helical configuration shown.

In combination, respective baffles (82 84 86) and first and second circumferential rings 19 and 20 divide cavity 60 into respective fluid channels or fluid passageways 88, 90, 92 and 94. Fluid channels 88, 90, 92 and 94 receive and direct the flow of the fluid medium around tank 12. That is, after the fluid medium is provided from the tube 24 via opening 26 (or 28) formed in sheet 15, fluid flow of fluid medium is directed in directions 96, 98, 100, and 102 over and against the outer peripheral surface 14 of tank 12. It should be understood that the fluid medium may flow in directions opposite to directions 96, 98, 100, and 102. An exemplary fluid medium is warmed in order to heat the contents of tank 12 wherein thermal energy as heat of the fluid medium is transferred through the wall structure and outer peripheral surface 14 into the contents of tank 12. The contents of tank 12 which is located substantially lateral adjacent the outer peripheral surface 14 will directly be affected by the thermal energy. If the fluid medium is cooled in order to cool the contents of tank 12, then thermal energy as heat of the fluid medium is transferred through the wall structure and outer peripheral surface 14 from the contents into the cooled fluid medium.

In the exemplary embodiment shown, fluid channels 88, 90, 92 and 94 extend around tank 12 forming a substantially continuous path along substantially an entirety of a height along the vertical axis of tank 12. Accordingly, the thermal or thermodynamic relationship is established, and correspondingly the thermal energy is transferred, through substantially an entirety of the surface area of a sidewall of the wall structure of tank 12. Moreover, substantially an entirety of a column of the contents along the vertical axis within tank 12 is in a direct thermodynamic relationship with the fluid medium. That is, thermal energy is transferred directly between the entirety of the column of the contents along the vertical axis and the fluid medium.

Still referring to FIG. 3, thermal regulating system 10 is selectively operated to heat or cool tank 12 and the contents therein. An exemplary tank 12 is cylindrical wherein the outer peripheral surface 14 is a cylindrical sidewall of tank 12 which defines substantially an entirety of the height along a vertical axis of tank 12. In one exemplary embodiment, the heat exchanger 34 comprises an air conditioning unit, the contents comprises wine and the fluid medium comprises air wherein the wine is to be cooled by the air. Ambient air supplied to the air conditioning unit 34 wherein the air conditioning unit 34 dehumidifies the air. An exemplary air conditioning unit is manufactured by Heat Controller, Inc., with an exemplary brand being Comfort-Aire® having an exemplary capacity of 10,000 Btu's. Dehumidified air is beneficial for efficiency of operation of thermal regulating system 10, and therefore, ambient air is provided at atmospheric pressure and cooled with the moisture content of the air preferably being removed. Accordingly, thermal regulating system 10 of this invention operates under atmospheric pressure and conditions which is economical and efficient compared with conventional thermal regulating systems, particularly the conventional system that use liquids such as glycol. Due to friction, glycol creates thermal energy as heat during flow through tube or conduit structures, and the heat is additional thermal energy that has to be moderated and dealt with which effectively diminishes the efficiency of conventional thermal regulating systems.

The air conditioning unit 34 forces or drives the cooled air to begin an air flow through tube 24, through inlet 26 and into cavity 60. In one embodiment, steering vanes (shown but not referenced with a number) are provided across inlet 26 to direct the cool, dehumidified air in a generally tangential relation within cavity 60 over and along the outer peripheral surface 14 of tank 12. The tangential flow of the air relative the outer peripheral surface 14 facilitates continued air flow around tank 12 along directions 96, 98, 100 and 102 within fluid channels 88, 90, 92 and 94. The cooled air contacts a first portion of the outer periphery surface 14 of tank 12 proximate inlet 26 to begin the thermal energy transfer across the first portion of the outer peripheral surface 14 between the cooled air and wine mass of tank 12. The wall structure, including outer peripheral surface 14, will have thermal energy transfer characteristics depending at least the following factors: composition, thickness, configuration and type of materials used for the wall structure of tank 12. An exemplary thermal energy transfer characteristic includes a rate of thermal energy that can be transferred across a unit volume of the wall structure (including outer peripheral surface 14) per unit time.

As the cooled air continues traveling through fluid channels 88, 90, 92 and 94, the cooled air contacts additional different portions of the outer peripheral surface 14. Each contact establishes a thermal energy transfer across the outer peripheral surface 14 of the wall structure, for example, a second portion adjacent the first portion. Accordingly, the cooling of the wine mass continues. The air reaches the end of its travel around tank 12 at the end of the path through fluid channels 88, 90, 92 and 94 proximate outlet 28. The air continues moving and enters outlet 28 of tube 24 for further processing that includes the air being recycled through the air conditioning unit 34 to be re-cooled (or heated if this alternative is selected) and to begin anew the circulation of the re-cooled air through fluid channels 88, 90, 92 and 94. Accordingly, the thermodynamic relationship and the thermal energy transfer across outer periphery surface 14 of tank 12 begins anew.

As the cooled air continues through fluid channels 88, 90, 92 and 94 and continues contacting additional surface area of outer peripheral surface 14, the cooled air is continually being warmed and increasing in temperature. As the cooled air increases in temperature, the temperature continues to approach the temperature of the wine mass. That is, the temperature of the cooled air is continually approaching an equilibrium state with the temperature of the wine mass. As the cooled air approaches the equilibrium state, the rate of thermal energy transfer across the wall structure and outer peripheral surface 14 is continually decreasing. That is, as the cooled air travels around tank 12, it is continually receiving thermal energy from the wine mass and continually being warmed. Since the cooled air is continually being warmed, the rate of thermal energy transfer is continually decreasing (and of course, the quantity of heat transfer is continually decreasing since this parameter is included in a rate equation) as the cooled air travels along the outer peripheral surface 14. Once the equilibrium state is reached, thermal energy transfer across the outer periphery surface 14 will substantially cease.

In fact, the equilibrium state can be reached before the cooled air completes one cycle or trip through fluid channels 88, 90, 92 and 94 around tank 12. Once thermal energy or heat transfer ceases, the wine mass is no longer being cooled. Accordingly, in this embodiment of the thermal regulating system 10 shown in FIGS. 3 and 3A, the temperature of the fluid medium can reach an equilibrium state with the temperature of the contents of the tank 12 before the fluid medium finishes one complete circuit around tank 12. In this situation, there is a lack of uniform heat transfer across the outer peripheral surface 14 of tank 12 during a complete cycle or trip of the fluid medium. In this situation, the effectiveness and efficiency of this thermal regulating system 10 is greatly diminished. Additionally, the lack of uniform heat transfer across the outer peripheral surface 14 of tank 12 during a complete cycle or trip of the fluid medium impedes and/or prevents the development of effective convection currents needed to control, adjust and modify temperatures of the contents within tank 12. Consequently, the effectiveness and efficiency of this thermal regulating system 10 needs to be improved.

Moreover, this embodiment of the thermal regulating system 10 has additional issues that need to be addressed. For example, the greatest rate and quantity of thermal energy transfer occurs at the beginning of the fluid flow at the above-described first portion of the outer periphery surface 14 proximate inlet 26. The cooled air has not been warmed (maybe negligibly in tube 24) and has not increased in temperature at the beginning of fluid flow through fluid channels 88, 90, 92 and 94. Consequently, once thermal energy transfer begins, the greatest rate and quantity of thermal energy transfer occurs at this first portion of the outer periphery surface 14 proximate inlet 26. The rate and quantity of heat transfer can be so intense at this first portion of the outer periphery surface 14 that ice develops on the portion of the interior surface (not shown) opposite the first portion of outer peripheral surface 14. Ice is an insulator which means that thermal energy is insulated from being transferred across this first portion of outer peripheral surface 14. Heat transfer is impeded and/or terminates at the first portion of outer peripheral surface 14.

Furthermore, once ice forms opposite the first portion of outer peripheral surface 14 and heat transfer ceases, the cooled air moving over the first portion of outer peripheral surface 14 receives no thermal energy. Accordingly, the cool air reaches and contacts the second portion of the outer peripheral surface 14 adjacent the first portion still having its greatest cooling effect or capacity. This level of cooling capacity originally resulted in the ice being formed at the first portion, and therefore, ice begins to form opposite the second portion of outer peripheral surface 14. Consequently, ice can be formed on the interior surface (not shown) of wall structure along opposite serially adjacent portions of outer periphery surface 14. Since ice formation creates an insulating layer opposite the entirety of outer periphery surface 14 where thermal energy transfer needs to occur, the cooling process of the wine mass terminates effectively negating the purpose of the thermal regulating system 10. The effectiveness and efficiency of this thermal regulating system 10 needs to be improved.

A final issue with this thermal regulating system 10 which concerns the development of the ice. When ice is produced, the ice needs to be melted for the thermal regulating system 10 to begin functioning efficiency. However, the forming of ice is a heat source process wherein converting a fluid from the gas or liquid state to a solid state releases thermal energy as heat. If the desire is to cool the wine mass of tank 12, this heat energy is additional thermal energy that has to be absorbed by the cooled air produced by the thermal regulating system 10. Accordingly, the cooled air is receiving thermal energy as heat during the melting of the ice, but the cooled air is not cooling the wine mass. The cooled air is losing its capacity to cool the wine, and therefore, the thermal regulating system 10 becomes inefficient and ineffective having to continually provide energy to melt the ice instead of cooling the wine mass. Consequently, thermal regulating system 10 needs to be improved to selectively distribute the thermal energy transfer across different portions of the outer periphery surface 14 of the wall structure. That is, the thermal energy transfer characteristics of different portions of the wall structure should be modified to at least: prevent the fluid medium from reaching a temperature equilibrium state with the temperature of the contents before finishing a complete cycle or fluid flow trip through fluid channels 88, 90, 92 and 94 around tank 12; and prevent the formation of ice on the interior surface of the wall structure of tank 12.

FIGS. 4 and 4A illustrate an exemplary vessel, container or tank 142 that will be modified for incorporation into a thermal regulating system 140 according to one embodiment of the present invention. This embodiment of thermal regulating system 140 and all subsequently disclosed inventive embodiments solve the issues discussed above. The inventive embodiment of thermal regulating system 140 and all subsequently disclosed inventive embodiments may include all the structural components, configurations, materials and dimensions disclosed above with respect to thermal regulating system 10. That is, all the discussions above with respect to tank 12 of FIG. 3 are applicable to subsequently described tanks for subsequently disclosed thermal regulating systems.

Tank 142 comprises a wall structure 141 (FIG. 4A) having an exterior surface or outer peripheral surface 144 opposite an inner surface or interior surface 197. In one embodiment, outer peripheral surface 144 forms at least a portion of an entirety of the outer or exterior surface area of tank 142. In another embodiment, outer peripheral surface 144 can include an entirety of exterior surface area which would include top and bottom portion not shown. In the shown embodiment, outer peripheral surface 144 forms substantially an entirety of a sidewall surface area of tank 142, and will be referred to as sidewall surface 144. All the discussions above with respect to outer periphery surface 14 of FIG. 3 are applicable to sidewall surface 144. Inner surface or interior surface 197 forms or defines an inner or interior cavity which has an inner or interior volume to receive contents provided therein, for example, solid materials and/or fluids, such as juice and/or wine.

Tank 142, including wall structure 141, is formed from any exemplary material characterized as thermally insulative material and/or thermally conductive material, and any material characterized as between thermally conductive and thermally insulative such as semiconductive material. Exemplary materials for tank 142 include polymers, glass, crystal structures, ceramics, plastics, fiberglass, metals, metal alloys, polyethylene, wood, stainless steel and include any combination of the various materials. An exemplary crystal structure includes quartz. An exemplary stainless steel includes a thickness of 16 gauge and having a composition of, for example, Type 304. Additionally, exemplary tank 142 can be formed from any number of layers of the various materials and having any thickness for the respective layers. An exemplary thickness of the walls of tank 142 depends on the selected material(s) and the size of the interior volume of tank 142. As the interior volume of tank 142 increases (and correspondingly an increase in the volume of contents that can be held in the tank), the thickness of the wall configuration routinely needs to be increased in order to hold the volume of contents. What ever material(s), number of layers and thickness of the layers used for tank 142, tank 142 will have respective values for thermal energy transfer characteristics, for example, respective values for rate and/or quantity of thermal energy that will transfer (thermal energy transfer) across a unit volume of the wall structure 141 for a given unit of time. Thermal energy transfer occurs by any method known, for example, by thermal conduction, thermal convection and thermal radiation or thermal electromagnetic radiation.

In this exemplary tank 142, wall structure 141 includes sidewall surface 144 which includes an entirety of a side surface area of tank 142. Accordingly, in this exemplary embodiment, sidewall surface 144 excludes bottom and top walls or surfaces of tank 142. An exemplary sidewall surface 144 is cylindrically shaped with a circular horizontal cross section. Sidewall surface 144 includes seams 146 wherein sections of material are secured together to form sidewall surface 144 of tank 142. In other embodiments, seams would not exist if sidewall surface 144 is formed as a single piece, for example, from materials such as polymers and plastic. Moreover, other exemplary horizontal cross-sectional shapes for sidewall surface 144 are possible, and include rectangular, hexagonal, square and oval to name only a few configurations. An exemplary height along a vertical axis for tank 142 is approximately twelve feet (shown relative individual 152) and has an exemplary interior volume capacity of about 1,000 to about 2,700 gallons. However, other exemplary sizes or capacities for tank 142 can range from less than about one gallon to about 200,000 gallons with vertical heights ranging from less than about one foot to about 50 feet. Still other capacities for tank 142 can range below one gallon, for example, about 10 milliliters which is a tank that can be used in forming and/or processing ruby crystal growth. Exemplary tank 142 includes a first access opening or manway 150 (or access hatch) for accessing the interior volume of the cavity defined by interior surface 197 and is formed through an uppermost surface or top wall (not shown) of tank 142. A second access opening 116 is provided in a lower portion of sidewall surface 144 and through wall structure 141 of tank 142 to further facilitate accessing the interior volume of tank 142.

FIG. 5 illustrates an exemplary step of a method for incorporating tank 142 into thermal regulating system 140 according to one embodiment of the present invention. For illustration purposes, it is assumed that individual 152 makes the modifications to tank 142 discussed subsequently. First circumferential ring 112 is secured to, and to surround, an upper circumferential portion of sidewall surface 144. First circumferential ring 112 extends laterally outwardly from sidewall surface 144. A second circumferential ring 157 is secured to, and to surround, a lower circumferential portion of sidewall surface 144. Second circumferential ring 157 extends laterally outwardly from sidewall surface 144. Exemplary first and second circumferential rings 112 and 157 are formed from the same material, or different respective materials. All the discussions above with respect to first and second circumferential rings 19 and 20 of FIG. 3 are applicable to first and second circumferential rings 112 and 157.

Exemplary materials for first and second circumferential rings 112 and 157 comprise thermally insulative material and/or thermally conductive material such as polymers, plastics, fiberglass, metals, metal alloys, stainless steel, polyethylene, wood, foam, flexible foam, molded polymer composite, formed metal, low density foam, high density foam, styrofoam, high density styrofoam and high density polyethylene foam and including any combinations of these materials. First and second circumferential rings 112 and 157 are secured to sidewall surface 144 of tank 142 by an adhesive, for example, hot melt glue. Alternatively, a combination of hot melt glue is used with poly foam tape, for example, a double stick foam tape manufactured by 3M.

Still referring to FIG. 5, a base portion 156 is provided below second circumferential ring 157, and preferably below an entirety of tank 142. Base portion 156 can be formed from all the above stated exemplary materials for first and second circumferential rings 112 and 157. Base portion 156 preferably comprises insulative material configured to insulate tank 142 from a supporting surface on which tank 142 rests. Alternatively, base portion 156 can be the ground or floor of an enclosure such as a warehouse. A vane or baffle structure 158 (can be referred to as vanes, baffles, vane structure and/or baffle structure) is secured over, and in this embodiment, directly onto sidewall surface 144 of tank 142. All the discussions above with respect to baffles 82, 84 and 86 of FIG. 3 are applicable to vane structure 158. A layer or coating of material 110 is secured over, and in this embodiment, directly onto at least a portion of sidewall surface 144 between portions of vane structure 158 (layer 110 more thoroughly discussed subsequently). The vanes 158 can be provided before or after the providing of layer or coating 110. Alternatively, the respective structures (vanes 158 and layer 110) can be provided in staggered steps, wherein a portion of vane 158 is provided and then a portion of coating 110 is provided, or visa versa, and any combination of the staggered steps is applicable.

Exemplary materials for vanes 158 can include thermally conductive material and/or thermally insulative material such as rubber, polymers, plastics, fiberglass, metals, stainless steel, polyethylene, wood, foam, flexible foam, molded polymer composite, formed metal, low density polyethylene foam, high density foam, styrofoam, high density styrofoam and high density polyethylene foam, metal alloys and including any combinations of these materials. The illustrated vane structure 158 from this perspective of tank 142 appear as discrete sections oriented in a parallel and helical configuration around tank 142. However, it should be understood that to form the helical design shown, there are actually two continuous strips of material that surround tank 142. In this illustrated example, one continuous strip of vane structure 158 is spaced from the other, and both strips extend generally parallel relative to one another in the helical configuration.

However, numerous other exemplary designs for vane structure 158 are thoroughly described and discussed in the disclosure of the previously-filed patent application, Ser. No. 10/857,530, previously stated to be incorporated herein by reference. For example, other exemplary designs for vane structure 158 include patterns of discrete and discontinuous lengths or stipes of material having the same, or various different, length dimensions over sidewall surface 144. Additionally, each discontinuous and discrete portion or strips of vane structure 158 can comprise the same material, or different materials for respective different discrete portions. Exemplary vane structure 158 extends laterally from sidewall surface 144, generally perpendicularly from sidewall surface 144 with an outermost edge 159 spaced and generally parallel with sidewall surface 144. However, vane structure 158 can extend at an angle relative sidewall surface 144 with an exemplary range of angles being between about 0 degrees to about 180 degrees (with the understanding that 0 degrees and 180 degrees corresponds to outermost edge 159 being generally perpendicular to sidewall surface 144).

Vane structure 158 extends to surround at least a portion of the circumference of tank 142 with an exemplary configuration having a helical shape. Other configurations other than the helical shape are possible, for example, vane 158 can extend generally vertically along a vertical axis along the height direction of tank 142. Other configurations of vane 158 include vanes extending generally horizontal, or at any angle relative a horizontal axis, wherein opposite ends meet to form a circle around tank 142. From this side view, the helical configuration of vane structure 158 has various portions of vane 158 illustrated, with respective portions of vane structure 158 spaced from another portion of vane structure 158. The spacing between respective portions of vane structure 158 form respective channel regions 165, 180, 182, 184 and 186. The illustrated channel regions 165, 180, 182, 184 and 186 will be covered to form a fluid channel or fluid passageway of thermal regulating system 140 to be described subsequently. It should be understood that the respective channel regions 165, 180, 182, 184 and 186 can extend to surround tank 142 without interruption along an entirety of the vertical axis and along an entirety of sidewall surface 144 (with the further understanding that from this perspective, a fluid medium is alternatively moving down and up in respective adjacent channel regions, see FIG. 7).

An illustrated flow of an exemplary fluid medium is shown in FIG. 7, and it should be understood that the helical design of the exemplary channel regions has the fluid medium flowing in an upward fashion through channel region 180. Moreover, the fluid medium will flow in a downward fashion through the channel regions located elevationally below and above channel region 180. It should be understood that portions of areas over tank 142 can have channel regions that are blocked from the flow of the fluid medium by, for example, vertically extending vanes or baffles such as vertical baffles 188 and 118. Vertical baffle 118 isolates second access opening 116 from channel regions 182 and 186. Vertical baffle 188 will be more thoroughly discussed subsequently. It should be understood that various other configurations for vertical baffles 118 and 188 are possible, for example, additional vertical baffles could be included at any location within the channel regions 165, 180, 182, 184 and 186 on sidewall surface 144. Furthermore, each vertical baffle can have openings to extend through the structure from one vertical side to the opposite vertical side (particularly discussed with respect to FIGS. 17-19).

Again referring to FIG. 5, exemplary spacing dimensions along the vertical axis between respective portions of vane structure 158 that define respective channel regions 165, 180, 182, 184 and 186 will range from below about 1.0 inch to about 72.0 inches (6 feet). Another exemplary range for the spacing dimensions includes from about 6.0 inches to about 100 inches. For example, channel regions 165 and 180 measure about 40.0 inches. It should be understood that as an exemplary fluid channel extends around tank 142 along sidewall surface 144, the spacing dimensions can vary and are not necessarily uniform. For example, fluid channel 182 has one illustrated spacing dimension and as the fluid channel extends toward vertical baffle 118, the spacing dimension of fluid channel 182 increases in dimension. An exemplary vane structure 158 (with the understanding that this exemplary helical design has two separate and coordinated extensions of material surrounding tank 142 as discussed above) is secured directly to contact the sidewall surface 144 of tank 142. Alternatively, vane structure 158 can be positioned over and directly contact coating 110 without contacting sidewall surface 144. In the latter configuration, vane structure 158 may be secured to inside portions (portions facing tank 142) of coating 110, and/or of a housing 199 (discussed below), and/or of an outer shell 173 (discussed below), or secured to any combination of inside portions of sidewall surface 144, coating 110, housing 199 and/or outer shell 173.

Still referring to FIG. 5, an exemplary layer 110 can comprise various layer structures, for example, a solid layer such as a solid material layer, and alternatively, a porous layer such as a screen and/or mesh structure layer and/or a plastic scratcher pad material. Other exemplary layer structures for layer 110 comprise blown insulative material such as foam or plastic. Other exemplary layer structures for layer 110 comprise coatings of material such as paint and include paint with particles provided therein. Moreover, layer 110 can comprise any combination of these layer structures. Exemplary material compositions for layer 110 comprise: materials such as foam and all the variations thereof; flexible foam; molded polymer composite; plastic and all the variations thereof; fiberglass; metal and all the variations thereof such as alloys; metal foil; rubber and all the variations thereof; low density foam; high density foam; styrofoam; high density styrofoam; high density polyethylene foam; coatings and all the variations thereof; paint and all the variations thereof; and any various combinations of the material compositions, including any various combinations of the various layer structures discussed previously.

An exemplary layer 110 is provided over sidewall surface 144 to modify tank 142, particularly to change thermal energy transfer characteristics of wall structure 141. This exemplary layer 110 comprises a plurality of strips of material between respective portions of vane structure 158 within channel regions 165, 180, 182, 184 and 186. Exemplary layer 110 surrounds at least a portion of the circumference of tank 142 over at least a portion of sidewall surface 144 of tank 142, and alternatively, can cover an entirety of sidewall surface 144 of wall structure 141. That is, portions of layer 110 can be provided within an entirety of channel regions 165, 180, 182, 184 and 186, or only portions of respective channel regions 165, 180, 182, 184 and 186, and any combination thereof. Additionally, if exemplary channel regions do not cover an entirety of the area of sidewall surface 144 of tank 142, then layer 110 can be provided on portions of the area of sidewall surface 144 of tank 142 outside channel regions 165, 180, 182, 184 and 186. It should be understood that layer 110 can extend as a single continuous length of material, or be patterned in discrete, discontinuous lengths of material. Exemplary discrete and discontinuous length dimensions of layer 110 can have the same length dimension relative one another, or various different length dimensions. Exemplary layer 110 will have the same or various different width dimensions and the same or various different thickness dimensions.

Layer 110 can cover any portion of an exemplary fluid channel. An exemplary layer 110 can cover any combination of the infinite number of possible portions of exemplary fluid channels with alternative portions of exemplary fluid channels not being covered by layer 110. For example, if a first portion of an exemplary fluid channel is defined as a portion most proximate an inlet or intake from a heat exchanger, consider that first portion as being covered with layer 110. However, other portions of an exemplary fluid channel may or may not be covered. Other exemplary portions of sidewall surface 144 being covered by layer 110 include a center or middle portion adjacent the first portion. Alternatively, if a last portion of an exemplary fluid channel is defined as a portion most removed from the inlet or intake from the heat exchanger, this final portion may or may not be covered by layer 110. Alternatively, layer 110 can cover the first and last portions of an exemplary fluid channel wherein the middle portion of sidewall surface 144 is exposed within the exemplary fluid channel. It should be understood that any portion of sidewall surface 144 outside an exemplary fluid channel can be covered with layer 110, or uncovered, in combination with any portion of the exemplary fluid channel being covered, or uncovered, with layer 110.

In one exemplary embodiment, the exemplary layer 110 is provided in a helical configuration generally in conformance with the helical configuration of vane structure 158. It should be understood that layer 110 can extend over sidewall surface 144 at any angle relative vane structure 158, for example, along a horizontal axis relative tank 142. Each exemplary layer 110 is positioned adjacent another strip portion over sidewall surface 144. A plurality of strip portions of layer 110 are positioned adjacent one another, and preferably the plurality of strip portions of layer 110 are against one another to form seams 120 between respective edges of strip portions of layer 110. It should be understood that any number of layers 110 can be provided over sidewall surface 144 of wall structure 141. For example, a first portion of an exemplary fluid channel can have about six layers 110, and a middle portion of the exemplary fluid channel can have about four layers 110, and the last portion of the exemplary fluid channel can have about two or less layers 110. It should be understood that any one portion of exemplary fluid channel can have any number of layers 110 or lack thereof, and that portions of sidewall surface 144 outside exemplary fluid channels can have any number of layers 110 or lack thereof. The exemplary layer 110 will modify tank 142 to effectively change the respective values for the thermal energy transfer characteristics discussed previously for wall structure 141 and sidewall surface 144.

If an exemplary layer 110 comprises a plurality of layers, layer 110 can comprise any order of the plurality of layers, including air between any two of the layers. Additionally, an exemplary one embodiment has layer 110 as a solid layer adjacent a porous layer in any order and with any respective number of layers. Another embodiment of layer 110 includes a combination of a porous layer, a solid layer and a mesh structure in any order and with any respective number of layers. In another embodiment, layer 110 includes a combination of a porous layer over a first portion of an exemplary fluid channel, a solid layer over a second portion which is different from the first portion of the exemplary fluid channel and a mesh structure over a third portion which is different from the first and second portions of the exemplary fluid channel. Alternatively, each of the respective first, second and third portions may have a plurality of layers with various layer structures and various material compositions, and combinations of the respective layer structures and material compositions.

Additionally, various thicknesses of the same material compositions can be provided over different portions of an exemplary fluid channel. Thickness of layer 110 will be understood to be measured in a perpendicular direction relative the sidewall surface 144. For example, layer 110 can comprise ¼ inch polyethylene foam, for example, manufactured as Dupont sill seal and provided as a roll. The roll of layer 110 is provided generally as continuous strips over sidewall surface 144 of tank 142. To provide the different thickness, different portions of an exemplary fluid channel can have a different number of layers of the ¼ inch polyethylene foam thereby providing different total thicknesses of layer 110 for the different portions of an exemplary fluid channel. Alternatively, one portion of an exemplary fluid channel can have a single layer of ¼ inch polyethylene foam and another portion of the exemplary fluid channel can have a single layer of ¾ inch polyethylene foam, or any combination of different thicknesses for each of a plurality of layer 110.

An exemplary thickness dimension of layer 110 ranges from about 0.001 inch to about 12 inches. In fact, layer 110 could completely fill a channel region, for example, by an exemplary plastic scratcher pad material wherein the porous structure will allow a fluid medium to pass. Another exemplary thickness dimension of layer 110 ranges from about 2 inches to about 8 inches, with another exemplary thickness dimension ranges from about 3 inches to about 6 inches, and another exemplary thickness dimension ranges from about 0.125 inches to about 0.5 inches. An exemplary thickness dimension for layer 110 comprises about 0.25 inches. Another exemplary thickness dimension for layer 110 comprises about 4 inches. Additionally, an exemplary width dimension of layer 110 measured between respective seams 120 can range from about 0.5 inch to about 6 feet (72 inches), with another exemplary width dimension ranging from about 2 inches to about 36 inches, and another exemplary width dimension ranging from about 4 inches to about 24 inches. An exemplary width dimension for layer 110 comprises about 4 inches. Another exemplary width dimension for layer 110 comprises about 8 inches.

Still referring to FIG. 5, this exemplary embodiment of layer 110 is over an entirety of the area for channel regions 180, 182 and 184, and over only a portion of channel region 186. Portions of sidewall surface 144 on one side (right side in this view) of vertical baffle 188 represented as channel region 165 are exposed wherein no layer 110 is provided. The opposite side (left side in this view) of vertical baffle 188 has layer 110 over sidewall surface 144. Further in this exemplary embodiment, layer 110 is provided directly against the sidewall surface 144 of tank 142. Alternatively, layer 110 can be spaced from sidewall surface 144 with a stationary fluid in between, for example, a gas such as air. It should be understood that layer 110 can be provided over interior surface 197 of tank 142 (see FIGS. 4A and 11), and over any portion of interior surface 197, and in combination with layer 110 being provided over any portion of sidewall surface 144, or over any portion of interior surface 197 alone.

Referring to FIG. 6, bonding strips 122, for example a tape product, have an adhesive to allow strips 122 to be secured or attached over seams 120 of layer 110. An exemplary bonding strip 122 is doubled sided foam tape. Strips 122 will facilitate supporting layer 110 over sidewall surfaces 144 of tank 142. Alternatively, adhesive such as hot melt glue is provided over seams 120 separately and then strips 122 are provided over the adhesive. The strips 122 can be provided in addition to an adhesive (for example, double-sided foam tape) or glue already having been provided beneath layer 110 between sidewall surface 144 and layer 110. Alternatively, strips 122 can be provided without any additional adhesive between the sidewall surface 144 and layer 110 which leaves strips 122 to support layer 110 over the wall structure 141. Having only strips 122 to support layer 110 will facilitate subsequent removal of any one portion of layer 110 from sidewall surface 144 if so desired. Removing portions of layer 110 from the portions of sidewall surface 144 will allow further modification of tank 142 to provide the capability of further changing the values of the thermal energy transfer characteristics for the various portions of the sidewall surface 144. That is, tank 142 can be repeatedly modified to repeatedly change the value of the thermal energy transfer characteristics for any one portion of the sidewall surface 144 by adding, and alternatively removing, layer 110 from the various one portions of sidewall surface 144.

Now referring to FIG. 7, an exemplary fluid flow of a fluid medium or thermal regulating fluid is illustrated. The fluid flow is possible when exemplary housing 199 (shown in FIGS. 8-9) is provided over tank 142 as discussed subsequently. All the discussions above with respect to sheet 15 of FIG. 3 are applicable to housing 199. The following discussion with respect to fluid flow is with the understanding that housing 199 of FIGS. 8-9 is in place over tank 142 to form fluid passageways or fluid channels from channel regions 165, 180, 182, 184 and 186. A rectangular opening 132 represented by dashed lines indicates an opening 132 of housing 199 to receive fluid flow from an exemplary heat exchanger (148 shown in FIG. 9) relative tank 142. Vertical baffle 188 divides opening 132 into two spaced openings, an inlet 136 and an outlet 134. All the discussions above with respect to inlet 26 and outlet 28 of FIG. 3 are applicable to inlet 136 and outlet 134. Opening 132, inlet 136 and outlet 134 are in fluid communication with fluid channels 165, 180, 182, 184 and 186. Moreover, opening 132, inlet 136 and outlet 134 are configured as rectangles, and in other embodiments, can have other configurations such as circular configurations. Furthermore, inlet 136 and outlet 134 can be located at other positions relative tank 142 as long as fluid communication with exemplary fluid channels is maintained.

Still referring to FIG. 7, the exemplary heat exchanger (148 of FIG. 9) provides an exemplary fluid medium, for example, air through inlet 136. An exemplary heat exchanger 148 is a forced fluid device that includes a blower, fan, chiller, heater, any refrigeration system and an air conditioning unit. An exemplary air conditioning unit is manufactured by Heat Controller, Inc., with an exemplary brand being Comfort-Aire® having an exemplary capacity of 10,000 Btu's. It should be understood that a source of air is ambient air, and alternatively, any gas could be used. Additionally, any liquid could be used as a fluid medium, such as glycol and/or water. Fluid flow 138 represents an exemplary beginning or first fluid flow of the fluid medium from inlet 136. Fluid flow 138 travels over an exemplary first or beginning portion of sidewall surface 144 which in this exemplary embodiment is covered by layer 110. The fluid medium continues to flow around tank 142, for example, fluid flow 193 travels through fluid channel 180 and fluid flow 196 travels through fluid channels 182, 184 and 186. Fluid flow 139 represents an exemplary last or final fluid flow of the fluid medium through fluid channel 165 toward outlet 134. Fluid flow 139 travels over an exemplary last or final portion of sidewall surface 144 which in this exemplary embodiment is not covered by layer 110 until fluid flow 139 returns to heat exchanger 148 (FIG. 9) through outlet 134.

An exemplary pair of portions of vane structure 158 extend to intersect or join each other to form fluid channel 184. The exemplary pair of portions of vane structure 158 have exemplary slots or grooves 130 to facilitate the flow of the fluid medium between adjacent fluid channels. For example, the fluid medium flows into fluid channel 184 from fluid channels 182 and 186. Additionally, the dimension of vane structure 158 which extends from the sidewall surface 144 gradually diminishes as the exemplary pair of portions of vane structure 158 extend to meet at the intersection. This construction also facilitates the flow of the fluid medium between adjacent channel regions.

Consider an exemplary layer 110 that comprises insulative material. Further consider the exemplary insulative layer 110 provided over the first portion of sidewall surface 144 proximate inlet 136. The exemplary insulative layer 110 will impede or diminish the transfer of thermal energy across this first portion of sidewall surface 144. That is, the values of the thermal energy transfer characteristics of the first portion of sidewall surface 144 are changed or modified by the addition of the layer 110. This provides the capability to selectively adjust and/or modify tank 142 to impede or diminish thermal energy transfer across the first portion of the sidewall surface 144. This will effectively prevent ice formation on interior surface 197 (FIG. 4A) opposite the first portion of the sidewall surface 144 because the thermal energy transfer power or effect of the fluid medium is diminished or impeded.

Accordingly, thermal regulating system 140 will provide the capability for selectively modifying and adjusting thermal energy transfer characteristics of a portion of the wall structure 141 (FIG. 4A) of tank 142. Moreover, selectively adjusting and modifying thermal energy transfer characteristics along variable portions of an exemplary fluid channel fosters thermal energy transfer along an entirety of the path through the fluid channel. That is, the fluid medium is prevented from reaching a temperature equilibrium with the contents within tank 142, and therefore, the thermal energy transfer continues to occur between the contents and the fluid medium through an entirety of the path of the fluid channel. With thermal energy transfer occurring throughout an entirety of the fluid channel, efficiency of thermal regulating system 140 is greatly increased. Moreover, the period of time needed to adjust and/or modify a temperature of a region of the contents within a tank is greatly reduced. Accordingly, if the temperature of a portion of the contents within a tank is not within an acceptable temperature range, this exemplary embodiment of the thermal regulating system 140 provides the capability of a quick response time to bring the wayward temperature back within the acceptable temperature range. Additionally, the capability of being able to selectively adjust and modify thermal energy transfer characteristics along variable portions of fluid channels enables the selective creation or forming of different temperature strata regions within the wine mass. This is beneficial if you need different regions of the mass of contents within a tank to process at different temperatures, for example, a wine mass during fermentation.

Referring to FIGS. 8-9, an exemplary housing 199 is provided over tank 142 to effectively enclose substantially an entirety of sidewall surface 144 and form an exemplary fluid channel between respective portions of vane structure 158. Exemplary materials for housing 199 comprise molded or malleable material which include thermally insulative material and/or thermally conductive material, for example, polymers, plastics, fiberglass, metals, stainless steel, polyethylene, wood, foam, flexible foam, molded polymer composite, formed metal, low density foam, high density foam, styrofoam, high density styrofoam and high density polyethylene foam, metal alloys, rubber, rubber foam, and including any combinations of these materials. An exemplary thickness dimension for housing 199 can range from about 0.1 inch to about 24 inches, from about 1 inch to about 12 inches, and from about 2 inches to about 8 inches. An exemplary thickness dimension for housing 199 is about 2 inches. In one embodiment, housing 199 is a rectangular piece of material that has opposite side edges 163 and 164 which extend between a top edge 185 and a bottom edge 187. Side edge 163 has an inwardly extending opening 167. Side edge 164 has an inwardly extending opening 166. Opening 117 is provided in housing 199 to expose and allow manipulation of second access opening 116 through housing 199. A closure 194 is secured over opening 117 and to housing 199. Exemplary material for housing 199 includes styrofoam that can be purchased from Home Depot in large rolls and/or sheets.

Still referring to FIGS. 8-9, housing 199 is wrapped around tank 142 wherein side edges 163 and 164 meet to form a seam 195 and housing 199 substantially encloses tank 142. Upon wrapping tank 142 with housing 199, inwardly extending openings 166 and 167 are aligned and configured to form previously described opening 132, including inlet 136 and outlet 134. Accordingly, inwardly extending openings 166 and 167 form opening 132 to receive heat exchanger 148. Housing 199 has a pair of slits 168 extending downward from respective inwardly extending openings 166 and 167. Each slit 168 terminates to form a hole 169. Slits 168 and holes 169 are configured to allow housing 199 to be provided over heat exchanger supports 154 (FIG. 9) during the positioning of housing 199 on and/or off tank 142. However, this is assuming that heat exchanger 148 is secured to tank 142 before positioning of housing 199 on and/or off tank 142. Alternatively, housing 199 is positioned relative tank 142 before the heat exchanger 148 is secured to tank 142 wherein slits 168 may not be needed. Further, once housing 199 is provided over tank 142, top edge 185 of housing 199 is positioned proximate first circumferential ring 112 and bottom edge 187 is positioned proximate second circumferential ring 157.

Referring to FIG. 9, removable straps 198 are provided over housing 199 and closure 194 to secure housing 199 and closure 194 to tank 142. Exemplary straps 198 include 600 lb. polyester strapping. It should be understood that removable straps 198 have opposite ends with connectors (not shown) that can be repeatedly connected and unconnected to selectively allow removal and re-attachment of housing 199 relative to tank 142. An exemplary housing 199 is supported against vane structure 158 without being secured or fastened to vane structure 158 leaving only straps 198 to secure housing 199 over tank 142. In another embodiment, housing 199 is secured only to vane structure 158 wherein straps 198 are not needed. An attachment means or method between housing 199 and vane structure 158 include screws and/or an adhesive such as glue. In still another embodiment, straps 198 are used in combination with the attachment means to secure housing 199 to tank 142. If only straps 198 are used, housing 199 can more easily and quickly be removed from tank 142 to allow access to fluid channels and layer 110 for additional modification of tank 142.

Referring to FIG. 10, another exemplary thermal regulating system 240 is illustrated according to another embodiment of the present invention. This embodiment has outer shell 173 provided over housing 199 previously-described thermal regulating system 140. Outer shell 173 will protect housing 199 and provide additional protection to tank 142. An exemplary outer shell 173 comprises an insulative material and/or a conductive material. An exemplary thickness dimension for an outer shell 173 of insulative material will range from about 0.02 inches to about 12 inches. An exemplary thickness dimension for an outer shell 173 of conductive material will range from about 0.030 inches to about 1 inch. An exemplary material for outer shell 173 includes stainless steel or enameled steel.

Referring to FIG. 11, an exemplary sectional view of thermal regulating system 240 is taken along sectional line 11-11 of FIG. 10. The exemplary vane structure 158 is secured to sidewall surface 144 of tank 142 by at least one adhesive. An exemplary method of securing vane structure 158 to tank 142 is providing tape 175 on sidewall surface 144 and an adhesive 171 between tape 175 and vane structure 158, with adhesive being provided over at least one of the tape 175 and vane structure 158. It should be understood that the order of tape 175 and adhesive 171 can be reversed between vane structure 158 and sidewall surface 144. It should be understood that this exemplary method of securing vane structure 158 to tank 142 is applicable to all embodiments of thermal regulating systems described within this document. An exemplary tape 175 includes poly foam tape such as double stick foam tape manufactured by 3M. An exemplary adhesive includes glue, such as hot melt glue.

Tank 142 is supported on a foundation 183 adjacent base portion 156. An exemplary outer shell 173 is secured to second circumferential ring 157 by screw 179. The space between housing 199 and layer 110 represents an exemplary fluid channel 191. While straps 198 are not provided, in one exemplary embodiment of thermal regulating system 240 can be provided over housing 199 under outer shell 173. It should be understood that layer 110 can be provided over any portion of interior surface 197 of wall structure 141 instead of being provided over sidewall surface 144 of tank 142. Alternatively, layer 110 can be provided over any portion of interior surface 197 of wall structure 141 in combination with being provided over sidewall surface 144 of tank 142.

Referring to FIG. 12, another exemplary thermal regulating system 300 is illustrated according to another embodiment of the present invention. In this embodiment, the outer shell 173 is replaced by a plurality of sectional pieces 302 secured over housing 199 and tank 142. The width of respective sectional pieces 302 measured along the vertical axis can have any dimension with the understanding that the smaller the width, the more sectional pieces 302 needed to cover tank 142. An exemplary width of exemplary sectional pieces 302 is from about 6 inches to about 24 feet with an exemplary width being about 2 feet. One exemplary sectional piece 302 is secured to an elevationally adjacent sectional piece 302 by rivets 304 and/or screws.

Referring to FIGS. 13 and 13A, an exemplary sectional view of thermal regulating system 300 is taken along sectional line 13-13 of FIG. 12. In this exemplary embodiment, an exemplary housing 399 replaces housing 199 of the previously-described thermal regulating system. Housing 399 comprises a plurality of sections of material over tank 142. Each section of housing 399 is spaced elevationally adjacent a next section of housing 399 leaving a spacing 312 over exemplary vane structure 358 between respective sections of housing 399. In this exemplary embodiment, vane structure 358 replaces vane structure 158 of the previously-described thermal regulating system with the substantial difference being different dimensions. Vane structure 358 has an exemplary width extending along the vertical axis comprising about 4 inches and has an exemplary thickness extending perpendicularly from tank 142 comprising about 4 inches. Respective sections of housing 399 can rest against vane structure 358 with or without an adhesive. In this exemplary embodiment, sections of housing 399 have a space 320 relative respective sectional pieces 302, wherein the spacing can be provided by straps 198. In another exemplary embodiment, sections of housing 399 can be provided against housing 399.

Referring to FIG. 14, another exemplary thermal regulating system 400 is illustrated according to another embodiment of the present invention. In this exemplary embodiment, an exemplary mesh or screen structure 450 replaces layer 110 of the previously-described thermal regulating system. It should be understood that mesh structure 450 can be provided in combination with layer 110. An exemplary screen or mesh structure 450 can be provided over any portion of the surface area of sidewall surface 144 of tank 142. An exemplary screen or mesh structure 450 can be provided over any portion of the surface area of exemplary fluid channels. Exemplary shapes of openings in exemplary mesh structures 450 can comprise diamonds, squares, circles, rectangles, hexagons, etc. Exemplary combination configurations of screen or mesh structures 450 can comprise a plurality of mesh structures, one positioned over the other, and having the same or different shapes of openings wherein the openings can be aligned or misaligned over each other. Exemplary materials for mesh structures 450 include fibers, metal alloys, plastics, polymers, textiles, fabrics, silk, rubber, polymers, plastics, fiberglass, metals, stainless steel, polyethylene, wood, foam, flexible foam, molded polymer composite, formed metal, low density polyethylene foam, high density foam, styrofoam, high density styrofoam and high density polyethylene foam, metal alloys and including any combinations of these materials.

At least one exemplary method is now explained how the exemplary mesh structure 450 will change the value of at least one thermal energy transfer characteristic of tank 142. As a volume of an exemplary fluid medium such as air flows through an exemplary fluid channel, a portion of the volume of air will flow over mesh structure 450, another portion of the volume of air will exist in the openings of mesh structure 450. The portion of air in the openings will be relatively stationary relative to the portion of air moving over the mesh structure 450. Accordingly, the relatively stationary portion of air in the openings will act as an insulator which impedes or diminishes thermal energy transfer between the portion of air moving over the mesh structure 450 and the sidewall surface 144 of tank 142. In this exemplary thermal regulating system 400, the portions of sidewall surface 144 within the fluid channel which are covered by mesh structure 450 will have a different value for the at least one thermal energy transfer characteristic of tank 142 relative the portions of the sidewall surface 144 not covered by mesh structure 450.

Moreover, a section of mesh structure 450 can be stretched or strained by tensioning to selectively change or modify the influence the mesh structure 450 has on that portion of sidewall surface 144 being covered by the section. That is, if the sidewall surface 144 has a first value for the at least one thermal energy transfer characteristic, then the portion of sidewall surface 144 which is covered by mesh structure 450 has a second value for the at least one thermal energy transfer characteristic. Additionally, by stretching the section of the mesh structure 450, that portion of sidewall 144 covered by the stretched section of mesh structure 450 will have a second third value for the at least one thermal energy transfer characteristic. The third value will be a different from the first and second values for the at least one thermal energy transfer characteristic. It should be understood that mesh or screen structure 450 can be provided over any portion of interior surface 197 (FIGS. 4A and 11) of wall structure 141 instead of being provided over sidewall surface 144 of tank 142. Alternatively, mesh or screen structure 450 can be provided over any portion of interior surface 197 of wall structure 141 in combination with being provided over sidewall surface 144 of tank 142.

Another exemplary thermal regulating system according to another embodiment of the present invention, not illustrated, is now described. First consider that a fluid medium moving through a channel region will flow substantially in a laminar configuration. This laminar flow will have a first value for the at least one thermal energy transfer characteristic. Altering the laminar will produce another value for the at least one thermal energy transfer characteristic. Accordingly, this exemplary embodiment includes a method of placing obstructions on the sidewall surface 144 within channel regions. The obstructions will interrupt the laminar flow of the fluid medium to form turbulence within the fluid flow. The turbulent flow of the fluid medium will establish a heat transfer characteristic that produces a second value for the at least one thermal energy transfer characteristic.

Exemplary obstructions include any piece of material secured to sidewall surface 144, for example, by providing a rough coating of granules secured in a resin. Another exemplary method of providing obstructions includes blowing foam pieces on a wet resin base wherein the resin base is provided or coated on selected portions of the sidewall surface 144. The obstructions can be placed randomly on sidewall surface 144, or in an orderly or patterned fashion. The greater the volume or mass of each obstruction corresponds to an increase in the turbulence created in the fluid flow. It should be understood that only a few obstructions are needed to create the turbulent flow, and as each increases in size, mass and/or volume, the fewer number of obstructions needed. Moreover, it should be understood that turbulent fluid flow will generally increase thermal energy transfer across the sidewall surface 144. Accordingly, generally, the second value for the at least one thermal energy transfer characteristic resulting from turbulent fluid flow will be greater than the first value resulting from laminar fluid flow.

Referring to FIG. 15, another exemplary thermal regulating system 500 is illustrated according to another embodiment of the present invention. In this exemplary embodiment, an exemplary coating or paint material 504 replaces mesh structure 450 of the previously-described thermal regulating system. It should be understood that coating 504 can be provided in combination with layer 110 and/or in combination with mesh structure 450. An exemplary coating 504 includes a resin and can be provided over any portion of the surface area of sidewall surface 144 of tank 142. An exemplary coating 504 comprises a degree of opaqueness, and alternatively stated, a degree of translucency. An exemplary coating 504 comprises a fluid having a material therein that provides a degree of opaqueness or translucency to coating 504 wherein the degree of opaqueness or translucency can be selectively altered by the removal or addition of the material to coating 504. An exemplary material that is added to the coating 504 is graphite. For example, by changing or modifying the amount of graphite material within coating 504, the degree of opaqueness or translucency of coating 504 will correspondingly change or be modified. The exemplary coating 504 can be changed or modified to have an infinite number of different degrees of opaqueness or translucency.

In one exemplary embodiment, the amount of graphite within coating 504 is increased creating a higher degree of opaqueness, and stated alternatively, creating a lower degree of translucency. It should be understood that as the degree of opaqueness increases for coating 504, an increase in thermal energy is being absorbed by coating 504, and therefore, a decrease in thermal energy is being transferred across the sidewall surface 144 of tank 142. The addition of graphite to the resin for coating 504 corresponds to thermal energy being impeded or partially blocked from transferring across the sidewall surface 144 of tank 142.

In an exemplary configuration of coating 504, a first portion of sidewall surface 144 of tank 142 comprises coating 504 having a first degree of opaqueness or translucency, and a second different portion of sidewall surface 144 of tank 142 comprises coating 504 having a second different degree of opaqueness or translucency. The first degree is greater than the second degree, and alternatively, the first degree is less than the second degree. In another embodiment, a third different portion of sidewall surface 144 of tank 142 comprises coating 504 having a third different degree of opaqueness or translucency. It should be understood that any coating 504 can have its degree, of opaqueness or translucency selectively altered or changed to a lesser degree or a greater degree of opaqueness or translucency.

Still referring to FIG. 15, another exemplary coating 504 is described. An exemplary coating 504 comprises a degree of reflectivity. An exemplary coating 504 comprises a fluid having silver and/or aluminum material therein, or any material that has a reflectivity quality and provides a reflectivity quality to coating 504 when added to coating 504. For example, by changing or modifying the amount of silver and/or aluminum material within coating 504, the degree of reflectivity of coating 504 will correspondingly change or be modified. The exemplary coating 504 can be changed or modified to have an infinite number of different degrees of reflectivity. For example, as the amount of silver and/or aluminum is increased within the resin of coating 504, the degree of reflectivity is increased. As the degree of reflectivity of coating 504 is increased, the more thermal energy that is impeded or partially blocked from reaching the sidewall surface 144 and the contents within tank 142.

In an exemplary configuration of coating 504, a first portion of sidewall surface 144 of tank 142 comprises coating 504 having a first degree of reflectivity. A second different portion of sidewall surface 144 comprises coating 504 having a second different degree of reflectivity. The first degree is greater than the second degree, and alternatively, the first degree is less than the second degree. In another embodiment, a third different portion of sidewall surface 144 of tank 142 comprises coating 504 having a third different degree of reflectivity. It should be understood that any coating 504 can have its degree of reflectivity selectively altered or changed to a lesser degree or a greater degree of reflectivity. It should be understood that coating or paint material 504 can be provided over any portion of interior surface 197 (FIGS. 4A and 11) of wall structure 141 instead of being provided over sidewall surface 144 of tank 142. Alternatively, coating or paint material 504 can be provided over any portion of interior surface 197 of wall structure 141 in combination with being provided over sidewall surface 144 of tank 142.

Referring to FIG. 16, another exemplary thermal regulating system 600 is illustrated according to another embodiment of the present invention. In this exemplary embodiment, an exemplary collection of fin structures 612 extend upwardly from portions of sidewall surface 144 of tank 142. The exemplary fin structures 612 replace coating or paint material 504 of the previously-described thermal regulating system. It should be understood that fin structures 612 can be provided in combination with coating 504, layer 110 and/or in combination with mesh structure 450. An exemplary collection of fin structures 612 can be provided over any portion of the surface area of sidewall surface 144 of tank 142. An exemplary collection of fin structures 612 comprises intermittently spaced fin structures 612 extending generally perpendicularly from sidewall surface 144 having a spacing 618 between each respective fin structure 612. Spacing 618 between respective fin structures 612 can be any dimension desired with an exemplary range for spacing 618 being from about 0.1 inch to about 12 inches, with another exemplary range for spacing 618 being from about 1 inch to about 6 inches. An exemplary dimension for spacing 618 comprises 2 inches.

Still referring to FIG. 16, exemplary fin structures 612 can extend from sidewall surface 144 at any angle desired and ranging from about greater than 0 degrees to less than about 180 degrees. Exemplary fin structures 612 can comprise any material discussed previously with respect to material for vane structure 158. Exemplary fin structures 612 can extend from sidewall surface 144 and terminate with an uppermost surface 616. The uppermost surface 616 can be spaced from the sidewall surface 144 at any distance desired, and preferably, less than the same dimension for vane structure 158. If the vane structure 158 extends at a first dimension value from the sidewall surface 144, fins structures 612 can extend from sidewall surface 144 at any percentage of the first dimension value. For example, an exemplary percentage range includes fins structures 612 extending from sidewall surface 144 at least greater than 0 percent to less than 100 percent of the first dimension value, with another exemplary percentage range being from about 0.5 percent to about 25 percent.

In this exemplary embodiment, exemplary fin structures 612 have opposite ends spaced from respective portions of vane structure 158. It should be understood that the opposite ends can be spaced at any distance from the respective portions of vane structure 158, including being formed against the respective portions of vane structure 158. It should be understood that while the fin structures 612 extend substantially along or parallel to a vertical axis, the fin structures 612 can extend substantially at any angle desired relative the vertical axis. It should be understood that any shape, size, placement and angle of respective fin structures 612 can be adjusted, either individually or in groups, to modify or alter the thermal energy transfer characteristics of the sidewall surface 144 of tank 142. For example, fin structures 612 can be formed to be capable of movement relative sidewall surface 144 wherein the fin structures 612 can rescind below the sidewall surface 144 into tank 142. In this position, the fin structures 612 will not influence significantly the thermal energy transfer characteristics of the sidewall surface 144 of tank 142. Moreover, the fin structures 612 can move to position the uppermost surface 616 at selective elevational distances from sidewall surface 144. By selectively adjusting the distance of the uppermost surface 616 relative the sidewall surface 144, the thermal energy transfer characteristics of the sidewall surface 144 is selectively adjusted. Exemplary systems which provide the capability of moving fin structures 612 include manually moving the fin structures 612, electromechanically moving the fin structures 612, electrostatically moving the fin structures 612, and automatically moving the fin structures 612.

At least one exemplary method is now explained how the exemplary fin structures 612 will change the value of at least one thermal energy transfer characteristic of tank 142. As a volume of an exemplary fluid medium such as air flows through an exemplary fluid channel, a portion of the volume of air will flow over fin structures 612, another portion of the volume of air will exist in the spacings 618 between respective fin structures 612. The portion of air in the spacings 618 will be relatively stationary relative to the portion of air moving over the fin structures 612. Accordingly, the relatively stationary portion of air in the spacings 618 will act as an insulator which impedes or diminishes thermal energy transfer between the portion of air moving over the fin structures 612 and the sidewall surface 144 of tank 142. In this exemplary thermal regulating system 600, the portions of sidewall surface 144 within the fluid channel which are covered by fin structures 612 will have a different value for the at least one thermal energy transfer characteristic of tank 142 relative the portions of the sidewall surface 144 not covered by fin structures 612.

Another exemplary thermal regulating system according to another embodiment of the present invention, not illustrated, is now described. A structure similar to a set of venetian blinds is provided to encircle tank 142 and provided within the channel regions. The venetian blind structure will have a plurality of thin slats wherein the angle of the slats relative the sidewall surface 144 is controlled or adjusted by cords. The slats can extend at any angle relative a horizontal axis, and one embodiment the slats are configured similar to fin structures 612 of the previously described exemplary thermal regulating system 600. As the angle of the slats change relative the sidewall surface 144, the corresponding values of the thermal energy transfer characteristics will change, and the change will be selectable to the desire of the operator.

Similarly, another exemplary embodiment of present invention includes inflatable tubes provided in the channel regions. A second fluid medium will be provided in the inflatable tubes that can be the same, or different from, the fluid medium provided in the channel regions. The volume of the second fluid medium is selected to inflate the tubes to a selectable size of volume. As the size or volume of the inflatable tubes is selectively adjusted to increase or decrease, the corresponding values of the thermal energy transfer characteristics will change, and the change will be selectable to the desire of the operator. If the second fluid medium is to be the same as the fluid medium provided in the channel regions, then the inflatable tubes can be in fluid communication with the channel regions, and alternatively, the inflatable tubes are in fluid communication with the channel regions.

All the above described exemplary inventive embodiments of the thermal regulating systems (excluding the one described in FIGS. 3 and 3A) will impede or diminish the transfer of thermal energy across selected portions of sidewall surface 144 of tank 142, including the selected portions of sidewall surface 144 within exemplary fluid channels. That is, the values of the thermal energy transfer characteristics of the selected portions of sidewall surface 144 are changed or modified by the exemplary inventive embodiments of the thermal regulating systems This provides the capability to selectively adjusting and/or modifying tank 142 to impede or diminish thermal energy transfer across any selected portion of the sidewall surface 144. This will beneficially encourage convection currents within the contents of tank 142 by encouraging an overall and uniform thermal energy transfer along an entirety of the channel regions. This result will effectively prevent ice formation on interior surface 197 (FIG. 4) opposite any selected portion of the sidewall surface 144. Ice prevention is prevented because the thermal energy transfer power or effect of the fluid medium is diminished or impeded in selective areas to evenly distribute thermal energy across an entirety of the channel regions. That is, the temperature extremes of cooling or heating are eliminated allowing control of the thermal energy transfer and control of the temperature at the desired level of sidewall surface 144, and therefore, control of the temperature of the contents within tank 142.

Moreover, selectively adjusting and modifying thermal energy transfer characteristics along any selected portion of an exemplary fluid channel fosters thermal energy transfer along an entirety of the path through the fluid channel. That is, the fluid medium is prevented from reaching a temperature equilibrium with the contents within tank 142, and therefore, the thermal energy transfer continues to occur between the contents and the fluid medium through an entirety of the path of the fluid channel. With thermal energy transfer occurring throughout an entirety of the fluid channel, efficiency and control of the thermal energy transfer for thermal regulating system 140 is greatly increased. Moreover, the period of time needed to adjust and/or modify a temperature of a region of the contents within a tank is greatly reduced. Accordingly, if the temperature of a portion of the contents within a tank at a particular level is not within an acceptable temperature range, these exemplary embodiments of the thermal regulating systems provide the capability of a quick response time to bring the wayward temperature back within the acceptable temperature range. Additionally, the capability of being able to selectively adjust and modify thermal energy transfer characteristics along variable selected portions of fluid channels enables the selective creation or forming of different temperature strata regions within the contents within tank 142. This is beneficial if you need different regions of the mass of contents within a tank to process at different temperatures, for example, a wine mass during fermentation.

Figure 18B:
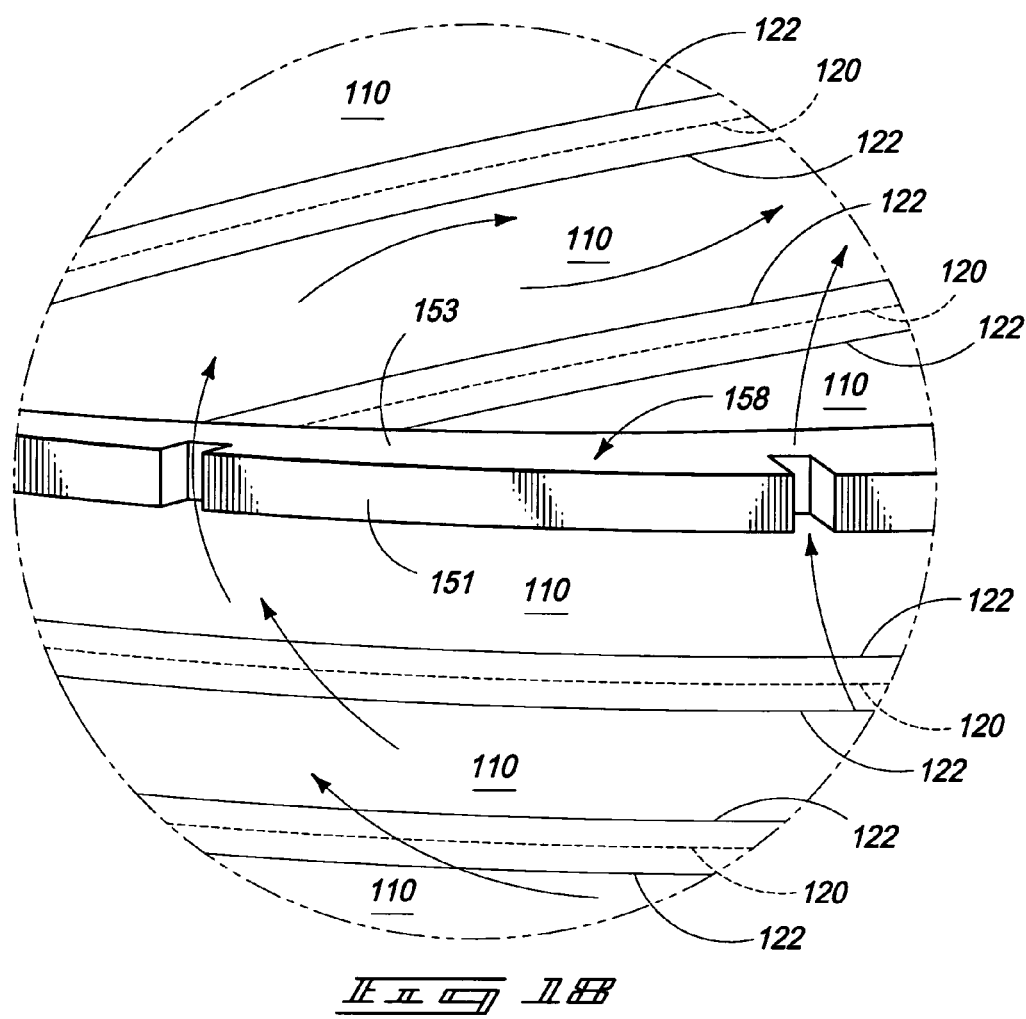
FIG. 18 is partial sectional view of an exemplary system for regulating temperatures of contents within a tank, the tank being illustrated with an exemplary baffle or vane structure for defining exemplary fluid channels according to a second embodiment of the present invention.
Figure 19:
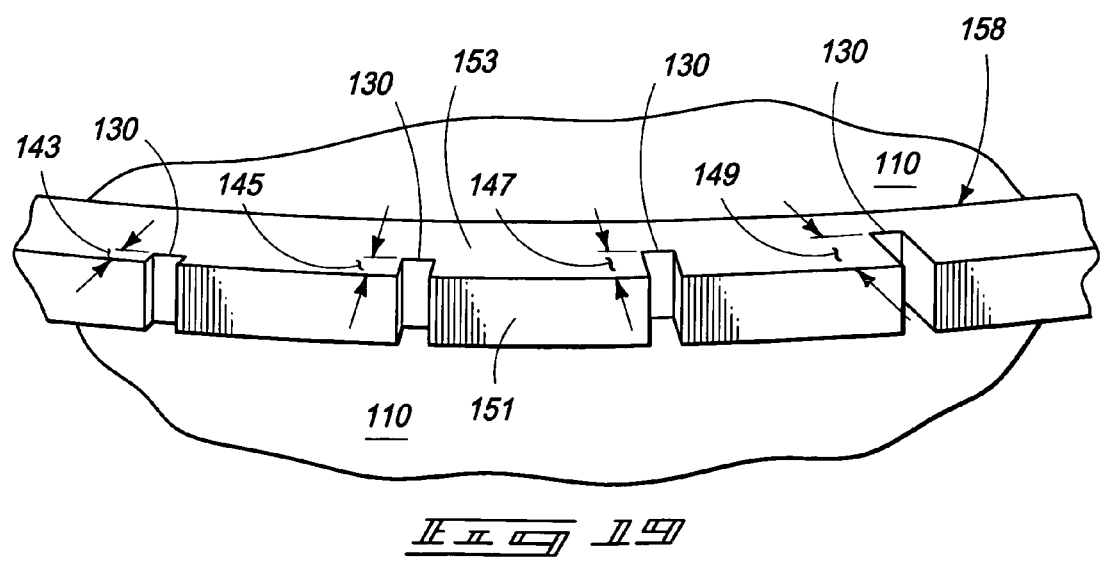
FIG. 19 is partial sectional view of an exemplary system for regulating temperatures of contents within a tank, the tank being illustrated with an exemplary baffle or vane structure for defining exemplary fluid channels according to a third embodiment of the present invention.

Referring to FIGS. 17-19, exemplary openings and/or slots are shown in exemplary vane structure 158 to facilitate the flow of an exemplary fluid medium through exemplary fluid channels between respective portions of vane structure 158. Referring to FIG. 17, exemplary openings 137 are illustrated to extend through an entirety of vane 158 and have a circular cross section. An exemplary range for diameters of openings 137 comprises from about 0.2 inch to about 36 inches. Other cross section configurations of openings 137 are possible, for example, square, rectangular, hexagonal, etc. Vane 158 has an outermost edge 151 connected to an upper surface 153 and opposite lower surface not shown. An exemplary upper surface 153 (and corresponding lower surface) are generally perpendicular to sidewall surface 144 and an exemplary outermost edge 151 is generally parallel to sidewall surface 144. Furthermore, an exemplary range of lengths 133 for upper surface 153 (and similarly lower surface not shown) comprises from about 0.1 inch to about 40 inches measured from layer 110 to outermost edge 151 (or measured from sidewall surface 144 if the vane 158 is provided directly against sidewall surface 144). Another exemplary range of lengths 133 for upper surface 153 comprises from about 2.0 inches to about 10 inches, for example, about 4.0 inches. An exemplary range of thicknesses 135 for outermost edge 151 comprises from about 0.03 inch to about 6 inches, for example, 2 inches. It should be understood that any reference to layer 110 in this document also includes mesh structure 450, coating 504 and fin structures 612.

Referring to FIGS. 18-19, exemplary slots 130 formed in vane 158 are formed to extend from outermost edge 151 to a selected distance inwardly at least partially into vane 158 toward tank 142. In other embodiments, exemplary slots 130 extend from outermost edge 151 entirely through vane 158 to sidewall surface 144 or layer 110 of tank 142. Exemplary distances for slots 130 measured from outermost edge 151 toward tank 142 can all be the same distances, or have various different distances 143, 145, 147 and 149. It should be understood that all of the exemplary embodiments of exemplary layers 110 described within this document can be provided over any portion of the interior surface 197 of tank 142, with or without the exemplary layer 110 being provided over sidewall surface 144. It should be understood that all of the exemplary embodiments of exemplary fluid channels described within this document can be provided over any portion of the interior surface 197 of tank 142, with or without the exemplary fluid channels being provided over sidewall surface 144.

It should be understood that the prior art tank of FIG. 1 can be incorporated into any one of the above discussed inventive embodiments of thermal regulating systems, FIGS. 3-19, to resolve the thermal energy transfer problems discussed relative the prior art tank of FIG. 1. For example, sheet or layer of flexible material 15 (FIG. 3) and/or housing 199 (FIG. 8) can be provided over tank 4 (FIG. 1) to form an air jacket around tank 4 (FIG. 1), with or without the fluid channels. A forced air device could be used to circulate ambient air around tank 4 (FIG. 1) using the air, and glycol moving through thermal jacket 3 (FIG. 1), as heat exchanging sources. Additionally, the glycol can be circulated through an exemplary heat exchanger such as the heat exchangers 34 (FIG. 3) and 148 (FIG. 9) which would be in fluid communication with the air jacket around tank 4 (FIG. 1).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method for modifying the processing capabilities of a container, the method comprising:
   providing a container defining a cavity to receive material for processing, the container comprising:
      a side wall connecting a top wall to a bottom wall:
      a vane structure comprising a first edge against the side wall and spiraling entirely around the container for a plurality of times, the vane structure comprising and a second edge opposite the first edge, the second edge spaced from the side wall; and
      a housing against the second edge of the vane structure and spaced from the side wall of the container, the housing sealing the side wall and vane structure from the environment wherein the housing, vane structure and side wall establish a fluid passage spiraling entirely around the container for a plurality of times, the side wall having thermal energy transfer characteristics, at least one of the thermal energy transfer characteristics comprising a first value; and
   changing the first value of the one thermal energy transfer characteristic to a second value for at least a first portion of the side wall, the second value being different from the first value.

2. The method of claim 1 wherein the changing comprises providing an insulative layer over the first portion of the side wall within the fluid passage.

3. The method of claim 1 wherein the changing comprises providing a metal foil layer over the first portion of the side wall within the fluid passage.

4. The method of claim 1 further comprising supporting a heat exchanger directly upon the container, the heat exchanger configured to force a fluid medium through the fluid passage.

5. The method of claim 4 wherein the changing comprises providing an insulative layer over the first portion of the side wall within the fluid passage, and wherein a second portion of the side wall is in the fluid passage and is devoid of an insulative layer, and wherein the heat exchanger forces the fluid medium against the first and second portions of the side wall within the fluid passage.

6. The method of claim 4 wherein the fluid medium comprises air.

7. The method of claim 4 wherein the heat exchanger recirculates substantially the same volume of the fluid medium against the first and second portions of the side wall within the fluid passage without the fluid medium exiting the heat exchanger and housing.

8. The method of claim 1 wherein the changing comprises providing a mesh or screen structure over the first portion of the side wall within the fluid passage.

9. The method of claim 1 wherein the changing comprises securing a rough coating of granules to the first portion of the side wall within the fluid passage.

* * * * *

UNITED STATES PATENT AND TRADEMARK OFFICE
CERTIFICATE OF CORRECTION

| | | |
|---|---|---|
| PATENT NO. | : 7,685,715 B2 | Page 1 of 1 |
| APPLICATION NO. | : 11/433323 | |
| DATED | : March 30, 2010 | |
| INVENTOR(S) | : David D. Rule | |

It is certified that error appears in the above-identified patent and that said Letters Patent is hereby corrected as shown below:

Col. 04 line 52 - replace "six" with -- sixth --
    Col. 06 line 62 - replace "strengthen" with -- strengthened --
    Col. 07 line 66 - replace "can located" with -- can be located --
    Col. 11 line 31 - replace "depending at" with -- depending on at --
    Col. 19 line 48 - replace "doubled" with -- double --
    Col. 22 line 48 - replace "199 previously-described"
                        with -- 199 of previously-described --
    Col. 24 line 45 - replace "have a second third" with -- have a third --
    Col. 24 line 47 - replace "will be a different" with -- will be different --

Signed and Sealed this

Thirtieth Day of November, 2010

David J. Kappos
*Director of the United States Patent and Trademark Office*